United States Patent
Kuroda et al.

(10) Patent No.: US 6,707,774 B1
(45) Date of Patent: Mar. 16, 2004

(54) RECORDING AND REPRODUCING SYSTEM, RECORDING APPARATUS AND REPRODUCING APPARATUS HAVING COPY PROTECTION FUNCTION

(75) Inventors: Kazuo Kuroda, Saitama-ken (JP); Toshio Suzuki, Saitama-ken (JP); Yoshiaki Moriyama, Saitama-ken (JP); Kazumi Sugaya, Saitama-ken (JP)

(73) Assignee: Pioneer Electric Corporation, Tokyo-To (JP)

( * ) Notice: Subject to any disclaimer, the term of this patent is extended or adjusted under 35 U.S.C. 154(b) by 0 days.

(21) Appl. No.: 09/346,934

(22) Filed: Jul. 2, 1999

(30) Foreign Application Priority Data

Jul. 3, 1998 (JP) .......................................... P10-204329

(51) Int. Cl.$^7$ ................................................. G11B 7/00
(52) U.S. Cl. ..................................................... 369/53.21
(58) Field of Search ............................... 369/53.2, 53.1, 369/53.21, 53.22

(56) References Cited

U.S. PATENT DOCUMENTS 5,809,006 A * 9/1998 Davis et al. ............... 369/53.2

FOREIGN PATENT DOCUMENTS

| EP | 0 706 174 | 4/1996 |
| WO | WO 97/13248 | 4/1997 |

OTHER PUBLICATIONS

I. Cox et al., "Some General Methods for Tampering With Watermarks", vol. 16, No. 4, May, 1998, pp. 587–593.

* cited by examiner

*Primary Examiner*—Nabil Hindi
(74) *Attorney, Agent, or Firm*—Young & Thompson

(57) ABSTRACT

An apparatus for reading record information from a recording disk and outputting the read record information in order to reproduce the record information recorded on the recording disk, is provided. The record information includes: image information which represents an image or a picture; identification information which represents any one of at least never copy and copy free. The never copy indicates that copying of the record information is prohibited. The copy free indicates that the copying of the record information is permitted. The apparatus comprises: a read device for reading the record information from the recording disk; a first determination device for determining whether the identification information included in the read record information indicates the never copy or the copy free; a second determination device for determining whether the recording disk is a recording disk of a recordable type or a recording disk of a read-only type; an output control device for determining on the basis of determinations of the first determination device and the second determination device whether outputting the read record information is permitted or prohibited; and an output device for outputting the read record information in accordance with a determination of the output control device.

9 Claims, 18 Drawing Sheets

| | DETERMINATION | | CONTROL |
|---|---|---|---|
| | WATERMARK | TYPES OF EXTERNAL APPARATUS | PERMISSION/PROHIBITION OF DIGITAL OUTPUT |
| 1 | NEVER COPY | AUTHORIZED APPARATUS | PERMISSION |
| 2 | | UNAUTHORIZED APPARATUS | PROHIBITION |
| 3 | ONE COPY | AUTHORIZED APPARATUS | PERMISSION |
| 4 | | UNAUTHORIZED APPARATUS | PROHIBITION |
| 5 | COPY-FREE | DETERMINATION IS NOT CARRIED OUT | PERMISSION |

FIG.5

| | DETERMINATION | | CONTROL |
|---|---|---|---|
| | WATERMARK | TYPES OF EXTERNAL APPARATUS | PERMISSION/PROHIBITION OF DIGITAL OUTPUT |
| 1 | NEVER COPY | AUTHORIZED APPARATUS | PERMISSION |
| 2 | | UNAUTHORIZED APPARATUS | PROHIBITION |
| 3 | ONE COPY | AUTHORIZED APPARATUS | PERMISSION |
| 4 | | UNAUTHORIZED APPARATUS | PROHIBITION |
| 5 | COPY-FREE | DETERMINATION IS NOT CARRIED OUT | PERMISSION |

FIG.8

| | DETERMINATION | | CONTROL | |
|---|---|---|---|---|
| | WATERMARK | COPY PROTECTION CODE | CGMS | RECORDING CONTROL SIGNAL | SCRAMBLE |
| 1 | NEVER COPY | DETERMINATION IS NOT CARRIED OUT | DETERMINATION IS NOT CARRIED OUT | PROHIBITION OF RECORDING | — |
| 2 | | NO MORE COPY | DETERMINATION IS NOT CARRIED OUT | PROHIBITION OF RECORDING | — |
| 3 | | ONE COPY | NEVER COPY | PROHIBITION OF RECORDING | — |
| 4 | ONE COPY | | ONE COPY | PERMISSION OF RECORDING | SCRAMBLE |
| 5 | | | COPY-FREE | PROHIBITION OF RECORDING | — |
| 6 | COPY-FREE (ABSENCE) | DETERMINATION IS NOT CARRIED OUT | NEVER COPY | PROHIBITION OF RECORDING | — |
| 7 | | | ONE COPY | PROHIBITION OF RECORDING | — |
| 8 | | | COPY-FREE | PERMISSION OF RECORDING | NON-SCRAMBLE |

FIG.11A

| | | | DETERMINATION | | | |
|---|---|---|---|---|---|---|
| | WATER-MARK | CGMS | TYPES OF DISK | SCRAMBLE | CERTIFI-CATION | TYPES OF EXTERNAL APPARATUS |
| 1 | NEVER COPY | NEVER COPY | READ ONLY | DETERMINA-TION IS NOT CARRIED OUT | DETERMINA-TION IS NOT CARRIED OUT | UNAUTHORIZED |
| 2 | | | | | | AUTHORIZED |
| 3 | | | RECORDABLE | | | DETERMINATION IS NOT CARRIED OUT |
| 4 | | ONE COPY | DETERMINATION IS NOT CARRIED OUT | | | |
| 5 | | COPY-FREE | | | | |
| 6 | | NEVER COPY | READ ONLY | PRESENCE | PRESENCE | UNAUTHORIZED |
| 7 | ONE COPY | | | | | AUTHORIZED |
| 8 | | | RECORDABLE | | ABSENCE | DETERMINATION IS NOT CARRIED OUT |
| 9 | | | | ABSENCE | | |
| 10 | | ONE COPY | DETERMINATION IS NOT CARRIED OUT | DETERMINA-TION IS NOT CARRIED OUT | DETERMINA-TION IS NOT CARRIED OUT | |
| 11 | | COPY-FREE | | | | |
| 12 | | NEVER COPY | READ ONLY | | | UNAUTHORIZED |
| 13 | COPY-FREE (ABSENCE) | | | | | AUTHORIZED |
| 14 | | ONE COPY | RECORDABLE | | | UNAUTHORIZED |
| 15 | | COPY-FREE | READ ONLY | | | |
| 16 | | | NO DETERMINATION | | | DETERMINATION IS NOT CARRIED OUT |
| 17 | | | RECORDABLE | PRESENCE | | |
| 18 | | | | ABSENCE | | |

FIG.11B

| | CONTROL | | |
|---|---|---|---|
| | READING CONTROL SIGNAL (PERMISSION/PROHIBITION OF READING) | DIGITAL OUTPUT | COPY PROTECTION CODE |
| 1 | PERMISSION | PROHIBITION | — |
| 2 | PERMISSION | PERMISSION | — |
| 3 | PROHIBITION | — | — |
| 4 | PROHIBITION | — | — |
| 5 | PROHIBITION | — | — |
| 6 | PROHIBITION | — | — |
| 7 | PERMISSION | PROHIBITION | REWRITE |
| 8 | PERMISSION | PERMISSION | REWRITE |
| 9 | PROHIBITION | — | — |
| 10 | PROHIBITION | — | — |
| 11 | PROHIBITION | — | — |
| 12 | PROHIBITION | — | — |
| 13 | PERMISSION | PROHIBITION | — |
| 14 | PERMISSION | PERMISSION | — |
| 15 | PROHIBITION | — | — |
| 16 | PROHIBITION | — | — |
| 17 | PERMISSION | PERMISSION | — |
| 18 | PROHIBITION | — | — |
| 19 | PERMISSION | PERMISSION | — |

RECORDING AND REPRODUCING SYSTEM, RECORDING APPARATUS AND REPRODUCING APPARATUS HAVING COPY PROTECTION FUNCTION

BACKGROUND OF THE INVENTION

1. Field of the Invention

The present invention relates to an information reproducing apparatus for reproducing digital information recorded on a recording disk such as a DVD, and more particularly to an information reproducing apparatus capable of prohibiting reproduction of digital information that has been illegally or unfairly copied.

2. Description of the Related Art

A DVD is a recording medium having a large recording capacity, and can record, for example, digital video information equivalent to one volume of moving picture film. Because of this large capacity, a DVD has come to be distributed as an image recording medium for replacing a video cassette of VHS system. A DVD exists in two types; a DVD onto which a recording or a rewriting cannot be done (It is referred to as a "read-only DVD", hereinafter.), and a DVD onto which a recording or a rewriting can be done (It is referred to as a "recordable DVD", hereinafter.). When a recordable DVD is used, it is possible to digitally copy the whole content of a moving picture recorded on the DVD.

Along with the distribution of the recordable DVD, there has been developed a system for digitally transmitting a moving picture or the like from a broadcasting station to general subscribers. When this system has been achieved, it becomes possible for subscribers to not only enjoy watching a high-definition moving picture at home but also digitally record the moving picture transmitted from the broadcasting station onto a DVD and prepare a replica disk in an easy manner.

On the other hand, the act of copying a moving picture or the like without permission is restricted by the copyright law, etc. Particularly, when a moving picture or the like is copied digitally, there occurs no quality degradation in the moving picture copied. Accordingly, it is necessary to severely restrict the copying of digital video information using a DVD in order to promote the distribution of DVD as well.

In order to restrict the recording or copying of digital video information, various methods have been proposed. For example, there is proposed a method of embedding identification information for restricting the copying into digital video information at the time of recording the digital video information onto a DVD. Such a system is generally called a CGMS (Copy Generation Management System). This identification information represents one of the following: (1) prohibiting the copying (hereinafter to be referred to as "Never Copy"), (2) permitting the copying only once (hereinafter to be referred to as "One Copy"), and (3) permitting the copying without restriction (hereinafter to be referred to as "Copy Free"). When digital video information embedded with this kind of identification information is copied onto other DVD, a recording apparatus reads out the identification information from within the digital video information, and if this identification information shows Never Copy, the recording apparatus does not record this digital video information.

Further, there is also proposed a method of restricting the copying of a picture or a video image by embedding identification information having a function similar to the above into the display range of the image or the video image as a watermark.

Meanwhile, since the DVD is an optical recording medium, a light beam is used in recording and reading the digital video information. Because of this, when recording the digital video information onto the DVD, the digital video information is converted into an RF (Radio Frequency) signal and then recorded onto the DVD. That is, the digital video information is actually recorded onto the DVD as the RF signal.

When reproducing the digital video information from the DVD, the RF signal is read from the DVD and then converted into the digital video information with a decoder.

It is possible to detect the CGMS and the watermark from the digital video information. However, it is not possible to directly detect them from the RF signal. This means that the restriction of the illegally or unfairly copying of the digital video information using the CGMS and the watermark is effective only after the RF signal is converted into the digital video information.

Therefore, the restriction of the copying of the digital video information using the CGMS and the watermark is not effective in an act of copying the RF signal from one DVD to another. If an act of reading the RF signal from the DVD and directly recording it onto another DVD is done, the CGMS and the watermark is not useful.

SUMMARY OF THE INVENTION

It is therefore an object of the present invention to provide an information reproducing apparatus capable of prohibiting reproduction of digital information which has been copied by copying an RF signal from one recording disk to another.

An information reproducing apparatus in accordance with the present invention is an apparatus for reading record information from a recording disk and outputting the read record information in order to reproduce the record information recorded on the recording disk.

The record information includes: image information which represents an image or a picture; identification information which represents any one of at least never copy and copy free.

The never copy indicates that copying of the record information is prohibited. The copy free indicates that the copying of the record information is permitted.

The information reproducing apparatus comprises: a read device for reading the record information from the recording disk; a first determination device for determining whether the identification information included in the read record information indicates the never copy or the copy free; a second determination device for determining whether the recording disk is a recording disk of a recordable type or a recording disk of a read-only type; an output control device for determining on the basis of determinations of the first determination device and the second determination device whether outputting the read record information is permitted or prohibited; and an output device for outputting the read record information in accordance with a determination of the output control device.

As stated above, the identification information indicates any one of the never copy and the copy free. For example, two different values may be used as the identification information. One is used as a value indicating the never copy. The other is used as a value indicating the copy free. Alternatively, only one value may be used as the identification information. In this case, when the value is included in the record information, it may be determined that the record information is the never copy. When the value is not included in the record information, it may be determined that the record information is the copy free.

In the above-stated information reproducing apparatus, the read device reads the record information from the recording disk. The first determination device determines whether the identification information included in the record information indicates the never copy or the copy free. Therefore, a copy restriction status of the record information can be determined.

The second determination device determines whether the type of recording disk is a recordable type or a read-only type. Therefore, the type of the recording disk can be determined. In addition, the recording disk of the recordable type is a recording disk that information can be recorded thereon once or many times. Both a rewritable disk and a recordable disk are included in the recording disk of the recordable type.

The output control device determines on the basis of the identification information and the type of recording disk whether outputting the read record information is permitted or prohibited. The output device outputs the record information in accordance with a determination of the output control device.

For example, when the identification information indicates the copy free and the type of recording disk is the recordable type, it is recognized that the record information that is allowed the copying has been recorded on the recordable type disk. This is normal. At this time, the output control device determines that outputting the record information is permitted. The output device therefore outputs the record information.

On the other hand, when the identification information indicates the never copy and the type of recording disk is the recordable type, it is recognized that the record information that is prohibited the copying has been recorded on the recordable type recording disk. This is abnormal. It can be expected illegal or unfair copying. If an RF signal is directly copied from one disk to another, this case occurs. In such a case, the output control device determines that outputting the record information is prohibited. The output device therefore does not output the record information. Thus, reproduction of an illegally or unfairly copied record information can be prevented.

In the above-stated information reproducing apparatus, the second determination device may includes: a detection device for detecting a form of a track formed on a surface of the recording disk; and a disk determination device for determining on the basis of a detection of the detection device whether the recording disk is the recording disk of the recordable type or the recording disk of the read-only type.

The recordable type recording disk and the read-only type recording disk are different from each other in physical structure. The second determination device determines the type of recording disk by detecting a difference in physical structure of the recording disk.

In the above-stated information reproducing apparatus, the second determination device may includes: a detection device for detecting a wobble of a track formed on a surface of the recording disk; and a disk determination device for determining on the basis of a detection of the detecting device whether the recording disk is the recording disk of the recordable type or the recording disk of the read-only type.

In the recordable type recording disk, the track has the wobble. In the read-only type recording disk, the track does not have the wobble. The second determination device determines the type of recording disk by detecting presence or absence of the wobble.

In the above-stated information reproducing apparatus, the second determination device may includes: a detection device for detecting a loop track formed on the surface of the recording disk; and a disk determination device for determining on the basis of a detection of the detecting device whether the recording disk is the disk of the recordable type or the disk of the read-only type.

Each of the recording disk of the recordable type and the recording disk of the read-only type has a spiral track. The spiral track is formed on a surface of the recording disk. The record information is recorded on the spiral track. Only the recording disk of the recordable type further has a loop track. The loop track is formed on the surface of the recording disk together with the spiral track. The loop track is different from the spiral track in form. The second determination device determines the type of recording disk by detecting presence or absence of the loop track.

In the above-stated information reproducing apparatus, the second determination device may includes: a detection device for detecting the disk information from the recording disk; and a disk determination device for determining on the basis of a detection of the detecting device whether the recording disk is the recording disk of the recordable type or the recording disk of the read-only type.

The recording disk has disk information. The disk information is recorded on the recording disk as digital data. The disk information indicates the type of the recording disk. The second determination device determines the type of recording disk by detecting the disk information.

In the above-stated information reproducing apparatus, the second determination device may includes: a detection device for detecting the standard information from the recording disk; and a disk determination device for determining on the basis of a detection of the detecting device whether the recording disk is the recording disk of the recordable type or the recording disk of the read-only type.

The recording disk has standard information. The standard information is recorded on the recording disk as digital data. The standard information indicates a standard of the recording disk. The standard of the recording disk is different depending on the type of recording disk. The second determination device determines the type of recording disk by detecting the standard information.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a view for showing a relationship between a determination and digital output control by the satellite broadcasting receiver in the first embodiment of the present invention;

FIG. 8 is a view for showing a relationship between the statuses of a watermark, a copy protection code and a CGMS and controls executed to these statuses by a controller;

FIGS. 11A and 11B are views for showing a relationship between the statuses of a watermark, CGMS, etc. and controls executed to these statuses by a controller;

DETAILED DESCRIPTION OF THE PREFERRED EMBODIMENTS

Referring to the accompanying drawings, embodiment of the present invention will be described. In the description set forth hereinafter, the present invention is applied to an information reproducing apparatus in a recording/reproducing system capable of recording, reproducing and copying digital video information which is transmitted from a digital satellite broadcasting system or which is recorded on a DVD.

A. First Embodiment
I. Recording/Reproducing System

Figure 1:
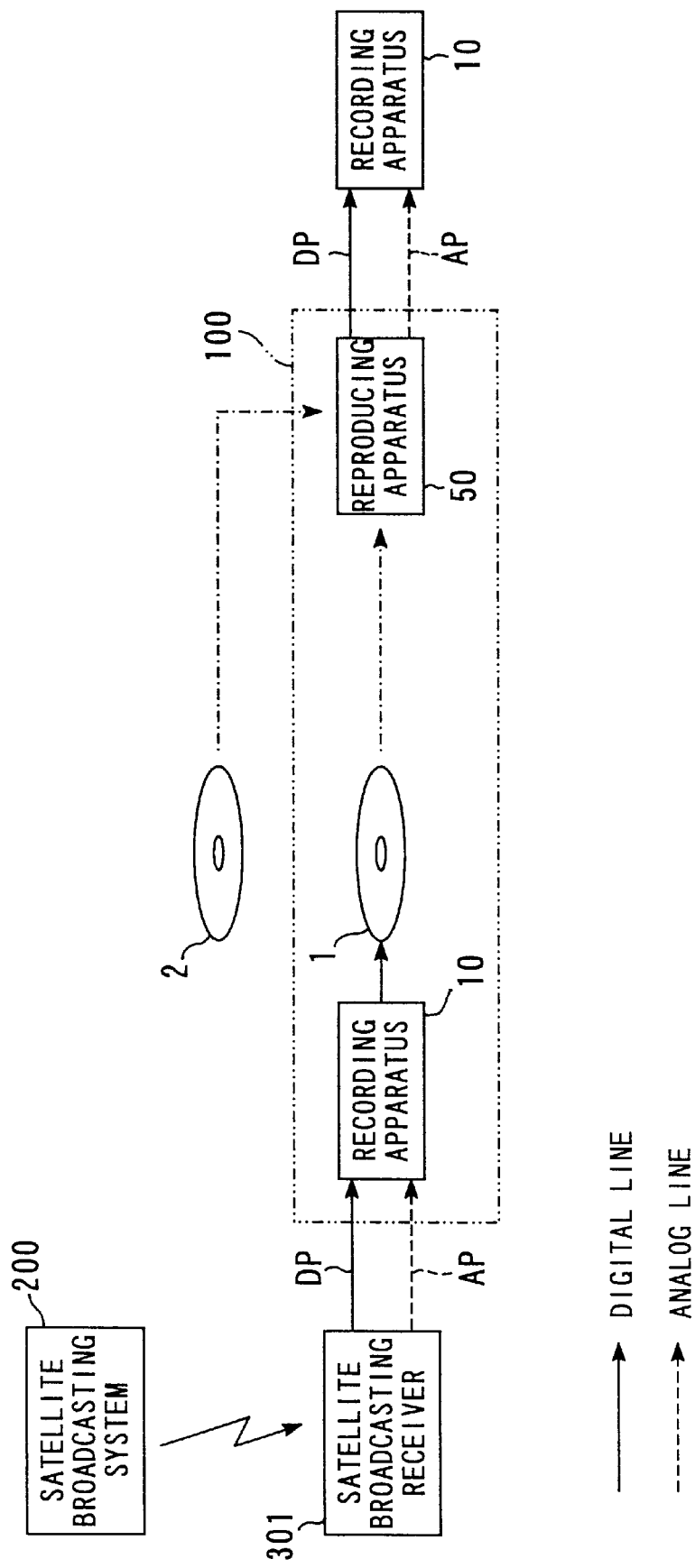
FIG. 1 is a block diagram for showing a recording/reproducing system according to a first embodiment of the present invention.

FIG. 1 shows a digital satellite broadcasting system as an information generation source and a recording/reproducing system and others according to an embodiment of the present invention.

As shown in FIG. 1, a recording/reproducing system 100 includes a recording apparatus 10, a reproducing apparatus 50 and a satellite broadcasting receiver 301.

The recording apparatus 10 is an apparatus for recording digital video information DP or analog video information AP input from the outside, onto a DVD 1 which is a recordable or rewritable recording medium (or a recordable DVD). The recording apparatus 10 is equipped with a digital input terminal for inputting the digital video information DP and an analog input terminal for inputting the analog video information AP, and records the digital video information DP input from the digital input terminal onto the DVD 1 as a digital data and converts the analog video information AP input from the analog input terminal into digital video information DP and records this data onto the DVD 1.

The reproducing apparatus 50 is an apparatus for reading out the digital video information DP recorded on the DVD 1 by the recording apparatus 10, and outputting this digital video information DP as it is or outputting this information as analog video information AP after converting this digital video information DP into the analog video information. The reproducing apparatus 50 is equipped with a digital output terminal for outputting the digital video information DP and an analog output terminal for outputting the analog video information AP. When an analog monitoring apparatus such as a CRT (Cathode Ray Tube) or a PDP (Plasma Display Panel) or the like (not shown) is connected to the analog output terminal of the reproducing apparatus 50, for example, it is possible to reproduce a picture or a video image recorded as the digital video information DP on the DVD 1. When the digital output terminal of the reproducing apparatus 50 is connected to the digital input terminal of the recording apparatus 10, as shown in FIG. 1, the digital video information DP recorded on the DVD 1 can be output as digital data to the recording apparatus 10 from the reproducing apparatus 50. In this case, it is possible to record the digital video information DP onto other DVD by the recording apparatus 10. As stated above, when the digital output terminal of the reproducing apparatus 50 is connected to the digital input terminal of the recording apparatus 10, the digital video information DP can be copied by digital transmission. As shown in FIG. 1, when the analog output terminal of the reproducing apparatus 50 is connected to the analog input terminal of the recording apparatus 10, the digital video information DP can be copied by analog transmission.

In FIG. 1, a satellite broadcasting system 200 is a system provided in a broadcasting station, for example, for carrying out a digital satellite broadcasting of a moving picture, a concert, a television program or the like. A satellite broadcasting receiver 301 is an apparatus for receiving a digital satellite broadcasting sent by the satellite broadcasting system 200, and is structured by an IRD (Integrated Receiver Decoder) or an STB (Set Top Box). The satellite broadcasting receiver 301 receives a wave transmitted from the broadcasting station and outputs the digital video information DP included in the received wave. Further, the satellite broadcasting receiver 301 can also convert the digital video information DP included in the received wave into the analog video information AP and outputs this analog video information.

The digital video information DP is compressed by MPEG2 (Moving Picture Expert Group Phase 2) for example, and includes digital data including digital video data, various headers and added information for example. The digital video data is digitized data of a picture or a video image structuring a moving picture, a concert, a television program or the like. A data format of the digital video information DP is different between a case where the digital video information DP is being recorded onto the DVD 1 and a case where the digital video information DP is being transmitted between the apparatuses. The analog video information AP is an analog video signal corresponding to the digital video information DP.

The digital video information DP and the analog video information AP are respectively applied with one of the copy protections of Never Copy, One Copy (or One Generation Copy) and Copy Free. Never Copy means the entire prohibiting of the recording of the digital video information DP or the analog video information AP onto a recording medium. One Copy means the permission of recording the digital video information DP or the analog video information AP onto a recording medium only once. In other words, by One Copy, making what is called a first-generation copy is permitted, but making copy of a second-generation and after is prohibited. Copy Free means no restriction of the copying of the digital video information DP or the analog video information AP onto a recording medium. By Copy Free, it is possible to make copy of the second generation and after, not to mention the first-generation copy.

In the case of carrying out a digital satellite broadcasting of a moving picture by the satellite broadcasting system 200 as shown in FIG. 1, for example, the digital video information DP transmitted from the satellite broadcasting system 200 and received by the satellite broadcasting receiver 301 is usually permitted to be recorded only once. In this case, the digital video information DP is One Copy. Further, when the digital video information DP such as a moving picture or the like is recorded in advance onto a read-only DVD 2 as shown in FIG. 1 and the DVD 2 is sold in the market, the reproduction of the digital video information DP recorded on the DVD 2 is usually prohibited. In this case, the digital video information DP is Never Copy. Further, when the DVD 2 recorded with the digital video information DP is distributed free of charge, the copying of the digital video information DP is not restricted in many cases. In this case, the digital video information DP is Copy Free.

The digital video information DP and the analog video information AP are embedded with a watermark, a copy protection code and a code based on CGMS (Copy Generation Management System) (hereinafter to be referred to as a "CGMS"). These are identification information for making the recording apparatus 10 and the reproducing apparatus 50 recognize the copy protection applied to the digital video information DP and the analog video information AP. The recording apparatus 10 and the reproducing apparatus 50 are based on a predetermined rule on the copy protection that prescribes a disposition, a decision method, a scrambling method, etc. of the watermark, the copy protection code and the CGMS, respectively. As described later, the recording apparatus 10 and the reproducing apparatus 50 can control the recording and reproduction of the digital video information DP and the analog video information AP based on the watermark, the copy protection code and the CGMS.

The watermark, the copy protection code and the CGMS will be explained next. The watermark is embedded within a picture or a video image without degradation of the quality of the picture or the video image itself. The watermark represents one of Never Copy, One Copy and Copy Free. In the present embodiment, it is assumed that when there exists no watermark within a picture or a video image, this represents Copy Free. The watermark is not changed by the recording apparatus 10 or the reproducing apparatus 50.

The copy protection code is embedded within a picture or a video image, and is disposed near the periphery of the display range of the picture or the video image. The copy protection code represents one of One Copy and No More Copy. "No More Copy" means the prohibition of copying any more as the One Copy digital video information DP or the One Copy analog video information AP has been recorded once onto the DVD 1 or the like. In this case, when the One Copy digital video information DP or the One Copy analog video information AP is once recorded onto the DVD 1 by the recording apparatus 10 and then the digital video information DP recorded on the DVD 1 is read out by the reproducing apparatus 50 and is converted into the analog video information AP and a result is output to the outside, the copy protection code of One Copy is changed to No More Copy by the reproducing apparatus 50.

The copy protection code represents One Copy and No More Copy respectively in two different statuses. It may be so arranged that when the copy protection code exists in the digital video information DP or the analog video information AP, the copy protection code represents One Copy, and when the copy protection code does not exist in the digital video information DP or the analog video information AP, this represents No More Copy. In this case, when the One Copy digital video information DP or the One Copy analog video information AP is once recorded onto the DVD 1 by the recording apparatus 10 and then the digital video information DP recorded on the DVD 1 is read out by the reproducing apparatus 50 and is converted into the analog video information AP and a result is output to the outside, the copy protection code is deleted by the reproducing apparatus 50.

Figure 2:
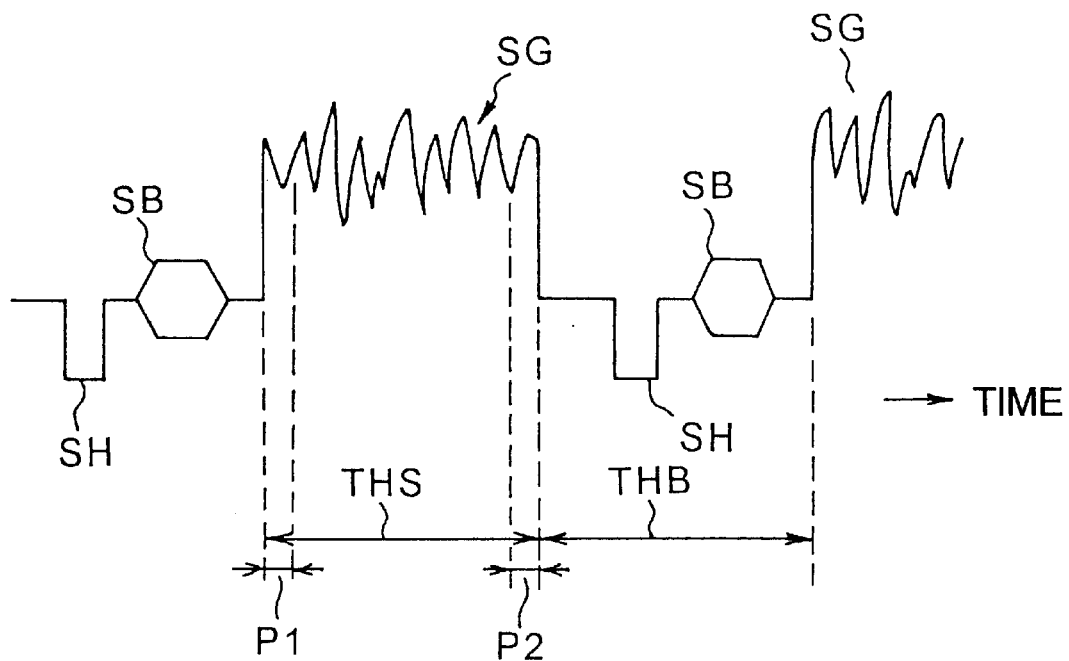
FIG. 2 is a waveform diagram for showing a video signal corresponding to analog video information in the first embodiment of the present invention.
Figure 3:
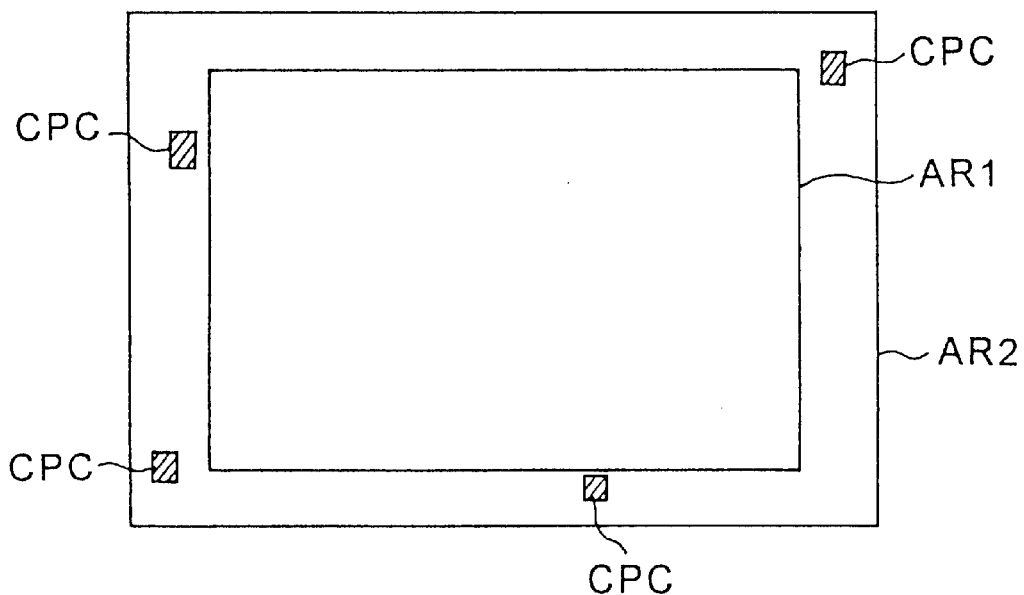
FIG. 3 is an explanatory view for showing a display range which an audience can actually watch, a range for forming a picture or a video image and a position where a copy protection code is embedded, in the first embodiment of the present invention.

Referring to FIGS. 2 and 3, a copy protection code embedded position will be explained by taking an example of the case where the analog video information AP is a video signal based on the NTSC (National Television System Committee) system. As shown in FIG. 2, the video signal of the NTSC system includes a horizontal synchronizing signal SH, a burst signal SB, a solid image signal SG for forming a picture or a video image, etc. A period corresponding to the solid image signal SG is a horizontal scanning period THS, and a period between the solid image signal SG and a next solid image signal SG is a horizontal blanking period THB.

A picture or a video image displayed on the CRT or the PDP is formed by the solid image signal SG within the horizontal scanning period THS. However, as shown in FIG. 3, in general, on the CRT or the PDP, a display range AR1 which can be actually watched by an audience exists in many cases inside an image forming range AR2 in which the picture or the video image is formed by the solid image signal SG. As a result, the vicinity of the peripheral portion of the display range AR1 outside the display range AR1 is a portion that cannot be actually watched by the audience. Depending on the type of the CRT and PDP, there are CRT's and PDP's in which the display range AR1 and the forming range AR2 almost coincide. Even in this case, the peripheral portion of the picture or the video image is not easily watched by the audience, and this is a portion that gives little effect to the picture or the video image.

Accordingly, as shown in FIG. 3, the copy protection code CPC is embedded in the vicinity of the peripheral portion of the display range AR1 outside the display range AR1 of the picture or the video image, although this embedded position is inside the image forming range AR2 of the picture or the video image. The vicinity of the peripheral portion of the display range AR1 outside the display range AR1 of the picture or the video image is formed by the solid image signal SG positioned at a starting portion P1 and an ending portion P2 of the horizontal scanning period THS. Accordingly, copy protection code CPC is embedded into the solid image signal SG positioned at the starting portion P1 and the ending portion P2 of the horizontal scanning period THS as shown in FIG. 2. Similarly, the copy protection code CPC is also embedded into the solid image signal positioned at a starting portion and an ending portion of a vertical scanning period.

CGMS is the identification information for carrying out the copy protection based on the Copy Generation Management System, and this represents one of Never Copy, One Copy and Copy Free, like the watermark. CGMS has two kinds of forms; CGMS-D for being added to the digital video information DP and the CGMS-A for being added to the analog video information AP. When the data format of the digital video information DP is a data format for recording onto a DVD, CGMS-D is written into the header area of each sector structuring the digital video information DP. CGMS-A is embedded into each scanning starting portion of line 20 and line 283, for example, of the horizontal scanning line of a video signal (analog video information AP). Further, CGMS is changed from One Copy to Never Copy by the recording apparatus 10 when One Copy digital video information DP or One Copy analog video information AP is recorded onto the DVD1 by the recording apparatus 10.

In the present embodiment, when the digital video information DP or the analog video information AP is Never Copy, a watermark representing Never Copy and a CGMS representing Never Copy are embedded. When the digital video information DP or the analog video information AP is One Copy, a watermark representing One Copy, a copy protection code representing One Copy and a CGMS representing One Copy are embedded. Further, when the digital video information DP or the analog video information AP is Copy Free, at least CGMS for representing Copy Free is embedded.

II. Satellite broadcasting receiver

The satellite broadcasting receiver 301 will be explained next. The satellite broadcasting receiver 301 can digitally output the digital video information DP included in the wave received from the satellite broadcasting system 200, or can output the digital video information DP after converting it into the analog video information AP. Accordingly, the satellite broadcasting receiver 301 is equipped with an analog output terminal for outputting the analog video information AP and a digital output terminal for outputting the digital video information DP.

Further, the satellite broadcasting receiver 301 has a function of deciding whether or not the digital video information DP is to be output from the digital output terminal, based on the watermark included in the received digital video information DP and the type of an external apparatus connected to the digital output terminal.

Figure 4:
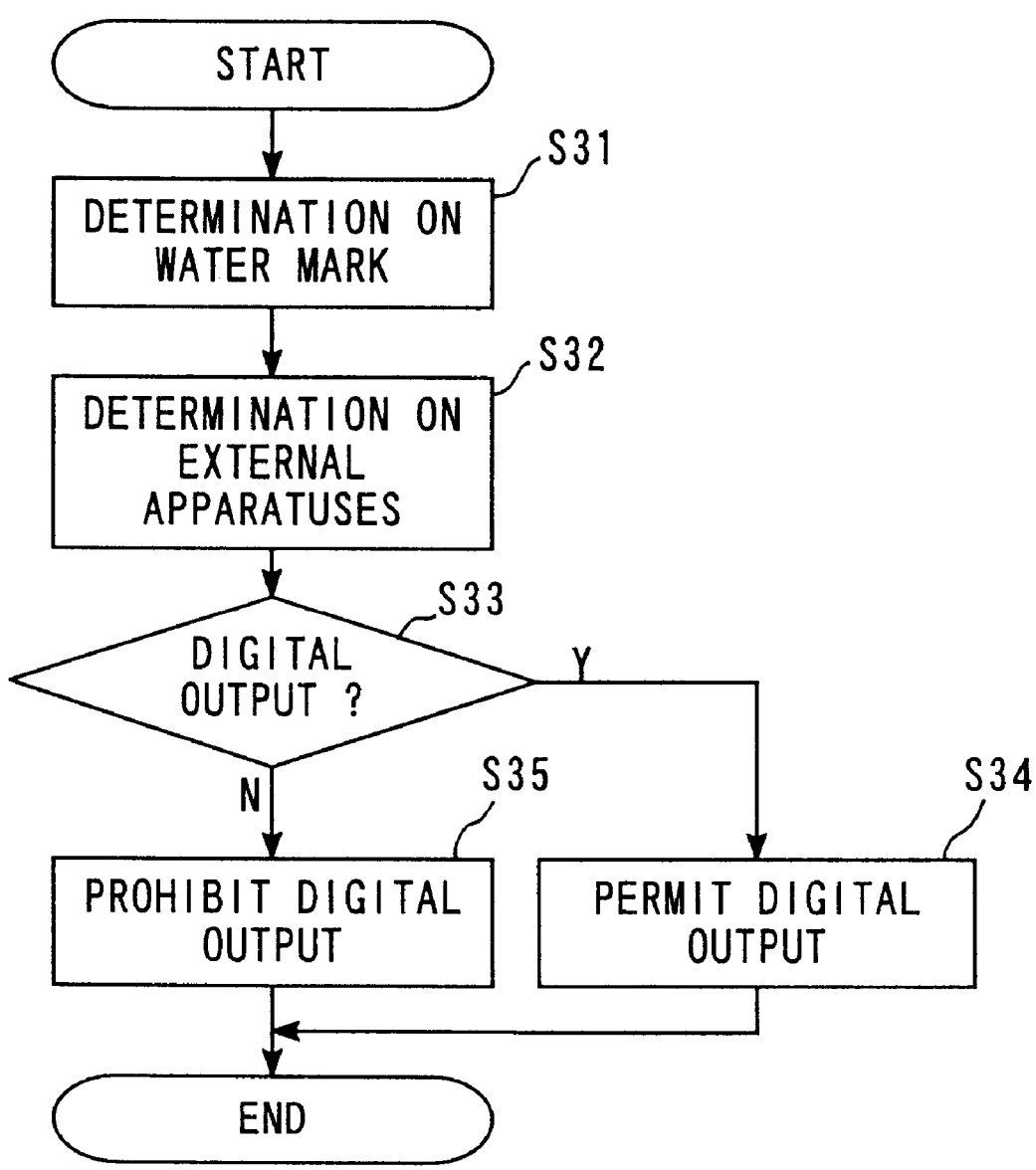
FIG. 4 is a flowchart for showing digital output control of a satellite broadcasting receiver in the first embodiment of the present invention.

Referring to FIG. 4, this function will be explained. When the satellite broadcasting receiver 301 has received the digital video information DP, the satellite broadcasting receiver 301 at first detects a watermark embedded within this digital video information DP, and determines whether this watermark represents Never Copy, One Copy or Copy Free (step 31). Next, the satellite broadcasting receiver 301 determines whether or not the types of the external apparatuses connected to the digital output terminal of the satellite broadcasting receiver 301 coincide with the types of authorized apparatuses registered in advance in the satellite broadcasting receiver 301 (step 32). In this case, the recording apparatus 10 of the recording/reproducing system 100 and authorized apparatuses not equipped with the function of recording the digital video information DP onto the recording medium, such as, for example, a digital monitoring apparatus and the like are registered in advance in the satellite broadcasting receiver 301. Then, the satellite broadcasting receiver 301 determines whether the received digital video information DP is to be digitally output or not, based on the status of the watermark and the determination of whether or not the external apparatuses are the authorized apparatuses (step 33).

FIG. 5 is a control management table for showing a relationship between each determination and control of the satellite broadcasting receiver 301. This control management table is recorded in advance in the satellite broadcasting receiver 301, and the satellite broadcasting receiver 301 makes a determination in the above step 33 by using the control management table.

As shown in the first row of the control management table in FIG. 5, when the watermark represents Never Copy and the external apparatus connected to the digital output terminal coincide with any one of registered the apparatuses, namely, any one of the authorized apparatuses, the satellite broadcasting receiver 301 outputs the digital video information DP from the digital output terminal (step 34). On the other hand, as shown in the second row, when the external apparatus connected to the digital output terminal do not coincide with any one of the authorized apparatuses, the satellite broadcasting receiver 301 does not output the digital video information DP from the digital output terminal (step 35). With this arrangement, it is possible to prevent the Never Copy digital video information DP from being output to the apparatuses equipped with the recording function other than the monitoring apparatus, for example. Thus, it is possible to restrict the copying by digital transmission of the digital video information DP.

As shown in the third row of the control management table in FIG. 5, when the watermark represents One Copy and the external apparatuses connected to the digital output terminal coincide with any one of the authorized apparatuses, the satellite broadcasting receiver 301 outputs the digital video information DP from the digital output terminal (step 34). On the other hand, as shown in the fourth row of the control management, when the external apparatuses connected to the digital output terminal do not coincide with any one of the authorized apparatuses, the satellite broadcasting receiver 301 does not output the digital video information DP from the digital output terminal (step 35). With this arrangement, it is possible to prevent the One Copy digital video information DP from being output to recording apparatuses other than the recording apparatus 10, for example. Thus, it is possible to restrict the copying by digital transmission of the digital video information DP.

Further, as shown in the fifth row of the control management table, when the watermark represents Copy Free, the satellite broadcasting receiver 301 outputs the digital video information DP from the digital output terminal (step 34).

III. Recording Apparatus

Figure 6:
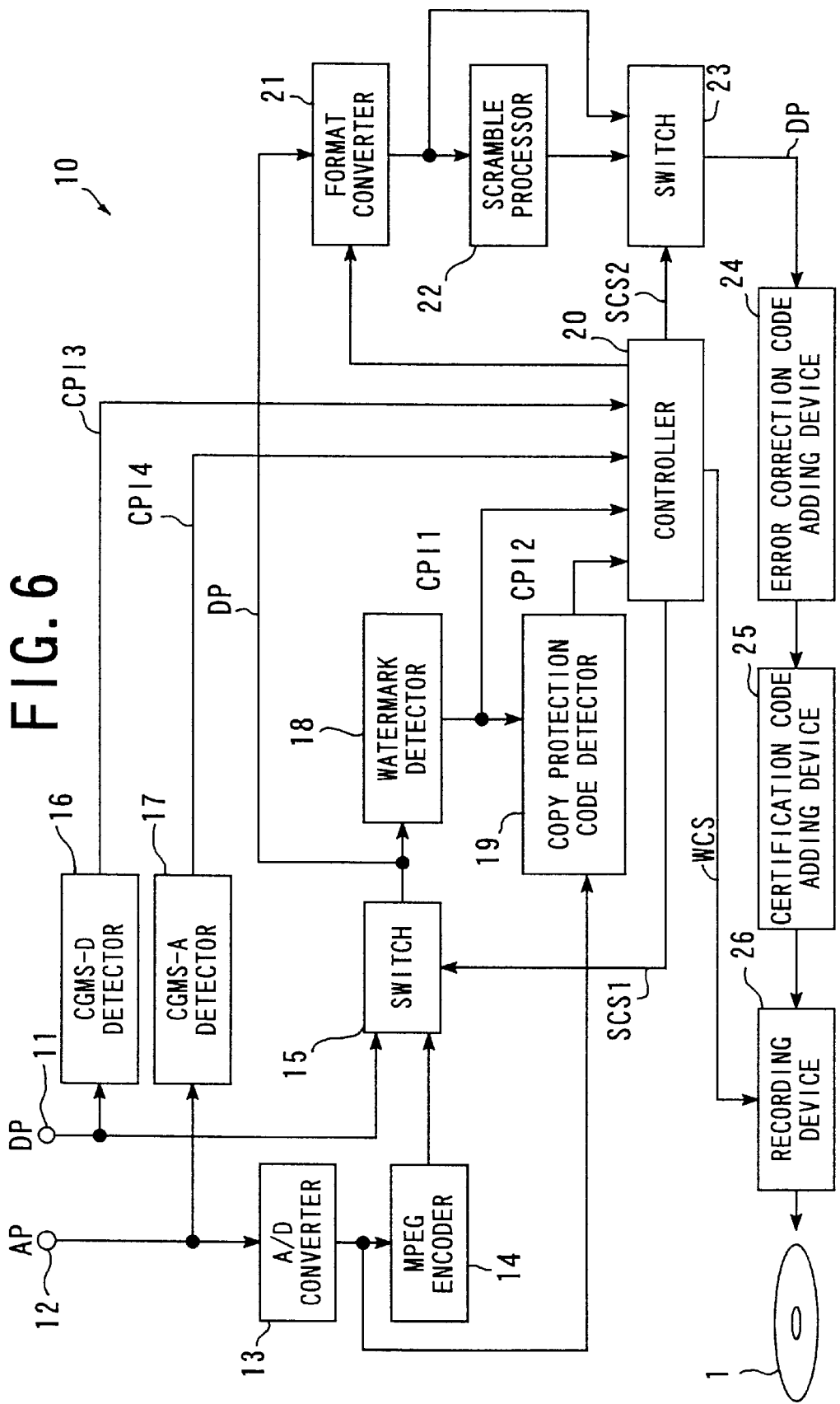
FIG. 6 is a block diagram for showing a recording apparatus according to the first embodiment of the present invention.

Referring next to FIG. 6, the recording apparatus 10 of the recording/reproducing system 100 will be explained.

As shown in FIG. 6, the recording apparatus 10 is equipped with a digital input terminal 11, an analog input terminal 12, an analog-digital (A/D) converter 13, an MPEG encoder 14, a switch 15, a CGMS-D detector 16, a CGMS-A detector 17, a watermark detector 18, a copy protection code detector 19, a controller 20, a format converter 21, a scramble processor 22, a switch 23, an error correction code adding device 24, a certification code adding device 25 and a recording device 26.

When the analog output terminal of the satellite broadcasting receiver 301 or the analog output terminal of the reproducing apparatus 50 is connected to the analog input terminal 12 of the recording apparatus 10, for example, the analog video information AP output from the satellite broadcasting receiver 301 or the reproducing apparatus 50 is input to the recording apparatus 10 from the analog input terminal 12. Then, this analog video information AP is input to the analog-digital converter 13 and the CGMS-A detector 17 respectively. The analog-digital converter 13 converts the analog video information AP into digital video information DP, and outputs it to the MPEG encoder 14 and the copy protection code detector 19 respectively. The MPEG encoder 14 encodes the video information DP output from the analog-digital converter 13 by using a coding system based on MPEG2 . As explained above, the analog video information AP is converted into the digital video information DP by the analog-digital converter 13 and the MPEG encoder 14, and a result is input to the switch 15.

The digital video information DP input to the switch 15 from the MPEG encoder 14 is output to the watermark detector 18 and the format converter 21 through the switch 15. The switch 15 is a switch for changing over between an input from the analog input terminal 12 and an input from the digital input terminal 11. The switch control of the switch 15 is carried out based on a switch control signal SCS1 output from the controller 20.

The watermark detector 18 detects the watermark from the digital video information DP input through the switch 15, and outputs watermark information CPI1 corresponding to this watermark to the copy protection code detector 19 and the controller 20 respectively. The copy protection code detector 19 detects a copy protection code from the video information output from the analog-digital converter 13, and outputs copy protection information CPI2 corresponding to this copy protection code to the controller 20. The copy protection code detector 19 may use the watermark information CPI1 output from the watermark detector 18, at the time of detecting the copy protection code from the digital video information DP. The CGMS-A detector 17 detects CGMS-A from the analog video information AP input from the analog input terminal 11, and outputs CGMS information CPI4 corresponding to this CGMS-A to the controller 20.

The format converter 21 converts the data format of the digital video information DP input through the switch 15 into a data format for recording onto a DVD. More specifically, in the format converter 21, the digital video information DP is divided into a plurality of sectors. Each sector consists of a header area positioned at the header portion of the sector, a data area positioned at the intermediate portion, and an error detection code area positioned at the end portion of the sector. Address management information, data control information, etc. necessary for the recording and reproduction onto and from the DVD are written in the header area. Digital video data corresponding to a picture or a video information is written in the data area. An error detection code for detecting an error of each sector or each group consisting of a plurality of sectors is written in an error detection code area. Further, the format converter 21 obtains CGMS information from the controller 20, generates CGMS-D corresponding to this CGMS information and adds this CGMS-D to the header area of each sector structuring the digital video information DP. When it is necessary to combine sound information with the digital video information, the format converter 21 obtains the sound information from a sound processing circuit not shown, combines this sound information with the digital video information, and writes the combined data in the data area of each sector.

The digital video information DP added with the CGMS-D is input to the scramble processor 22 and the switch 23 respectively from the format converter 21. The scramble processor 22 scrambles the digital video data recorded in the data area of each sector structuring the digital video information DP. As a result, the digital video information DP becomes data that cannot be reproduced unless the scramble is removed.

The switch 23 is a switch for changing over between the digital video information DP output from the format converter 21 through the scramble processor 22 and the digital video information DP directly output from the format converter 21. The switch control of the switch 23 is carried out based on a switch control signal SCS2 output from the controller 20. With this arrangement, it is possible to change over between the scrambled digital video information DP and the non-scrambled digital video information DP according to the control of the controller 20.

The digital video information DP output through the switch 23 is added with an error correction code by the error correction code adding device 24, and a result is input to the certification code adding device 25. The certification code adding device 25 adds a certification code to the digital video information DP added with the error correction code.

The certification code is the information for certifying that the digital video information DP has been recorded onto the DVD 1 by the recording apparatus 10. The certification code is detected by the reproducing apparatus 50 at the time of reproducing the digital video information DP by the reproducing apparatus 50. Scramble removal information for removing the scramble may also be included in the certified code. The certification code is a very small data added as an intentional error to the digital video information DP added with an error correction code. Accordingly, the certification code disappears based on an error correction by the reproducing apparatus 50 after the certification code has been detected by the reproducing apparatus 50.

The digital video information DP added with a certification code by the certification code adding device 25 is input to the recording device 26. When the controller 20 has permitted the recording, the recording device 26 records the digital video information DP onto the recordable DVD 1. On the other hand, when the controller 20 has prohibited the recording, the recording device 26 does not record the digital video information DP onto the DVD 1. The operation of the recording device 26 is controlled by a record control signal WCS output from the controller 20.

On the other hand, when the digital output terminal of the satellite broadcasting receiver 301 or the digital output terminal of the reproducing apparatus 50 is connected to the digital input terminal 11 of the recording apparatus 10, the digital video information DP output from the satellite broadcasting receiver 301 or the reproducing apparatus 50 is input to the recording apparatus 10 from the digital input terminal 11. As explained above, when it has been confirmed that the external apparatus connected to the digital output terminal of the satellite broadcasting receiver 301 is the recording apparatus 10 of the recording/reproducing system 100, the satellite broadcasting receiver 301 outputs the One Copy digital video information DP. As described later, the reproducing apparatus 50 outputs only the Copy Free digital video information DP when the external apparatus connected to the digital output terminal is other than the authorized apparatus (for example, other than the monitoring apparatus). However, when the non-compliant reproducing apparatus or others are connected to the digital input terminal 11 of the recording apparatus 10, it is not possible to predict what kind of status of digital video information DP is to be input.

When the digital video information DP is input to the recording apparatus 10 from the digital input terminal 11, this digital video information DP is input to the switch 15 and the CGMS-D detector 16 respectively. The digital video information DP input to the switch 15 is input to the watermark detector 18 and the format converter 21 respectively through the switch 15.

In this case, as described above, the watermark detector 18 detects a watermark from the digital video information DP, and outputs the watermark information CPI1 corresponding to this watermark to the controller 20. The CGMS-D detector 16 detects CGMS-D from the digital video information DP input through the digital input terminal 11, and outputs CGMS information CPI3 corresponding to this CGMS-D to the controller 20.

The digital information DP input to the format converter 21 is supplied to the recording device 26 through the scramble processor 23, the error correction code adding device 24 and the certification code adding device 25, as explained above, and this digital information DP is recorded onto the DVD1 by the recording device 26 when the recording has been permitted by the controller 20.

Figure 7:
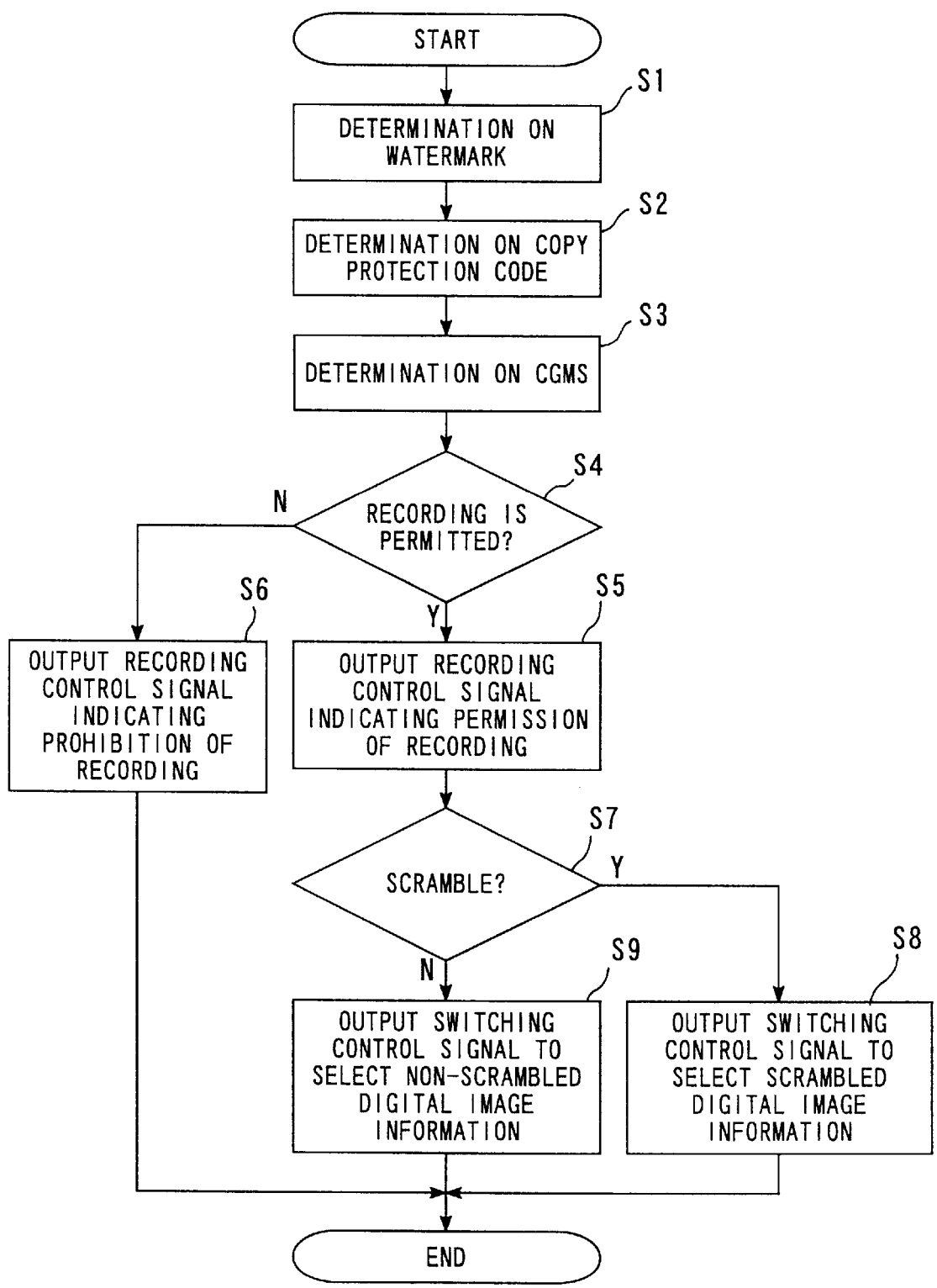
FIG. 7 is a flowchart for showing a record restriction control in the first embodiment of the present invention.

Further, the controller 20 is equipped with a CPU, memories, etc. and carries out an overall control of the recording apparatus 10, switch controls of the switches 15, 23 and a record restriction control as shown in FIG. 7.

Referring to FIG. 8, a record restriction control carried out by the controller 20 when the analog video information AP has been input to the recording apparatus 10 will be explained.

When the analog video information AP has been input to the recording apparatus 10, the controller 20 changes over the switch 15 to permit the input of the analog video information AP. The analog video information AP input to the recording apparatus 10 is converted into digital information by the analog-digital converter 13 and is input to the copy protection code detector 19, as described above, and at the same time, this analog video information AP is converted into the digital video information DP by the analog-digital converter 13 and the MPEG encoder 14, and is input to the watermark detector 18 and the format converter 21 through the switch 15. In this case, the controller 20 executes the record restriction control shown in FIG. 7. For the sake of convenience of explanation, the analog video information AP and the digital video information DP obtained by conversion based on this analog video information AP will hereinafter be collectively referred to as "video information".

In FIG. 7, the controller 20 determines whether the watermark included in the video information input to the recording apparatus 10 represents Never Copy, One Copy or Copy Free, based on the watermark information CPI1 output from the watermark detector 18 (step 1). Further, the controller 20 determines whether the copy protection code included in the video information input to the recording apparatus 10 represents No More Copy or One Copy, based on the copy protection information CPI2 output from the copy protection code detector 19 (step 2). Further, the controller 20 determines whether the CGMS included in the video information input to the recording apparatus 10 represents Never Copy, One Copy or Copy Free, based on the CGMS information CPI4 output from the CGMS-A detector 17 (step 3).

Next, the controller 20 determines whether the recording onto the DVD1 of the video information input to the recording apparatus 10 is to be permitted or prohibited, based on results of the determinations in steps 1 to 3 (step 4).

When the determination has been made that the recording of he video information onto the DVD1 is permitted (step 4=YES), the controller 20 outputs to the recording device 26 a record control signal WCS for showing the permission of the recording (step 5). Further, the controller 20 determines whether it is necessary or not to scramble the video information (more precisely, the digital video data written in the data area of each sector structuring the digital video information DP), based on the determinations in steps 1 to 3 (step 7). When the determination has been made that it is necessary to scramble the video information (step 7=YES), the controller 20 outputs the switch control signal SCS2 to the switch 23, and changes over the switch 23 so that video information scrambled by the scramble processor 22 is output to the recording device 26 (step 8). Thus, the scrambled video information is recorded onto the DVD1 by the recording device 26.

On the other hand, when the determination has been made that it is not necessary to scramble the video information (step 7=NO), the controller 20 outputs the switch control signal SCS2 to the switch 23, and changes over the switch 23 so that non-scrambled video information is output to the recording device 26 (step 9). Thus, the non-scrambled video information is recorded onto the DVD1 by the recording device 26.

When the determination has been made in step 4 that the recording onto the DVD1 of the video information input to the recording apparatus 10 is prohibited (step 4=NO), the controller 20 outputs to the recording device 26 the record restriction signal WCS for showing the prohibition of the recording (step 6). Thus, this video information is not recorded onto the DVD1.

Referring next to FIG. 8, the statuses of the watermark, the copy protection code and the CGMS included in the video information (analog video information AP) input to the recording apparatus 10 and the controls executed to these statuses by the controller 20 will be explained.

FIG. 8 is a control management table for showing a relationship between the statuses of the watermark, the copy protection code and the CGMS and the controls executed to these statuses by the controller 20. This control management table is recorded in advance in the memory of the controller 20, and the controller 20 carries out the record restriction control by using the control management table.

As shown in the first row of the control management table, when the watermark represents Never Copy, the controller 20 recognizes that the video information input to the recording apparatus 10 is Never Copy. In this case, the controller 20 outputs to the recording device 26 the record control signal WCS for prohibiting the recording. As a result, the Never Copy video information is not recorded onto the DVD1. Thus, it is possible to prevent the Never Copy video information from being copied.

Further, as shown in the second row of the control management table, when the watermark represents One Copy and the copy protection code represents No More Copy, the controller 20 recognizes that the video information input to the recording apparatus 10 is No More Copy. In this case, the controller 20 outputs to the recording device 26 the record control signal WCS for showing the prohibition of the recording. Thus, the No More Copy video information is not recorded onto the DVD1. Therefore, according to the recording apparatus 10 of the present embodiment, it is possible to prevent the No More Copy video information from being copied.

The recording of the video information of a moving picture or the like transmitted from the satellite broadcasting system 200 as shown in FIG. 1, for example, is permitted only once. For this purpose, the video information of a picture or the like transmitted from the satellite broadcasting system is embedded with the watermark for representing One Copy, the copy protection code for representing One Copy and the CGMS for representing One Copy respectively. When this video information is recorded onto the DVD 1 by the recording apparatus 10, the recording apparatus 10 changes the CGMS included in the video information from One Copy to Never Copy. Further, when the reproducing apparatus 50 reproduces the video information recorded on this DVD1, the copy protection information included in this video information is changed from One Copy to No More Copy. Accordingly, at the stage where the video information has been reproduced by the reproducing apparatus 50, the video information includes the watermark for representing One Copy, the copy protection code for representing No More Copy and the CGMS for representing Never Copy. Therefore, the controller 20 recognizes that when at least the watermark represents One Copy and the copy protection code represents No More Copy, this video information is No More Copy, and thus prohibits the recording of this video information onto the DVD 1 as described above.

Further, as shown in the fourth row of the control management table, when the watermark, the copy protection code and the CGMS all represent One Copy, the controller 20 recognizes that the video information input to the recording apparatus 10 is One Copy. In this case, the controller 20 outputs to the recording device 26 the record control signal WCS for showing the permission of the copying, and at the same time, changes over the switch 23 so that video information scrambled by the scramble processor 22 is output to the recording device 26. Thus, the One Copy video information is recorded onto the DVD 1 in a scrambled state. Accordingly, the audience cannot actually reproduce the video information recorded on the DVD1 even if he or she attempts to reproduce the video information by non-compliant reproducing apparatus other than the reproducing apparatus 50. This is because none of the non-compliant reproducing apparatus except the reproducing apparatus 50 can remove the scramble. As a result, it is possible to prevent the One Copy video information from being copied further by a non-compliant reproducing apparatus after this video information has been recorded onto the DVD 1. In this case, the non-compliant reproducing apparatus refers to other reproducing apparatus which is not based on a predetermined rule on the copy protection that prescribes the watermark included in the digital video information DP or analog video information AP, the copy protection code and the CMSG together with their respective dispositions, the decision method, the scramble processing method and the scramble removing method, and the like. The reproducing apparatus 50 is a compliant reproducing apparatus.

Further, as shown in the eighth row of the control management table, when the watermark and the CGMS represent Copy Free respectively, the controller 20 recognizes that the video information input to the recording apparatus 10 is Copy Free. In this case, the controller 20 outputs to the recording device 26 the record control signal WCS for showing the permission of the recording, and at the same time, changes over the switch 23 so that non-scrambled video information is output to the recording device 26. As a result, the Copy Free video information is recorded onto the DVD1 in non-scrambled state.

Further, as shown in the third row, the fifth row, the sixth row or the seventh row of the control management table respectively, when there is a contradiction among the watermark, the copy protection code and the CMGS, the controller 20 recognizes that there has been input to the recording apparatus 10 video information that may have been altered illegally. In this case, the controller 20 outputs to the recording device 26 the record control signal WCS for showing the prohibition of the recording. As a result, the video information with the potential of the information having been altered illegally is not recorded onto the DVD1. Therefore, according to the recording apparatus 10 of the present embodiment, it is possible to prevent the video information having the potential of illegal alteration from being copied.

IV. Reproducing apparatus

Figure 9:
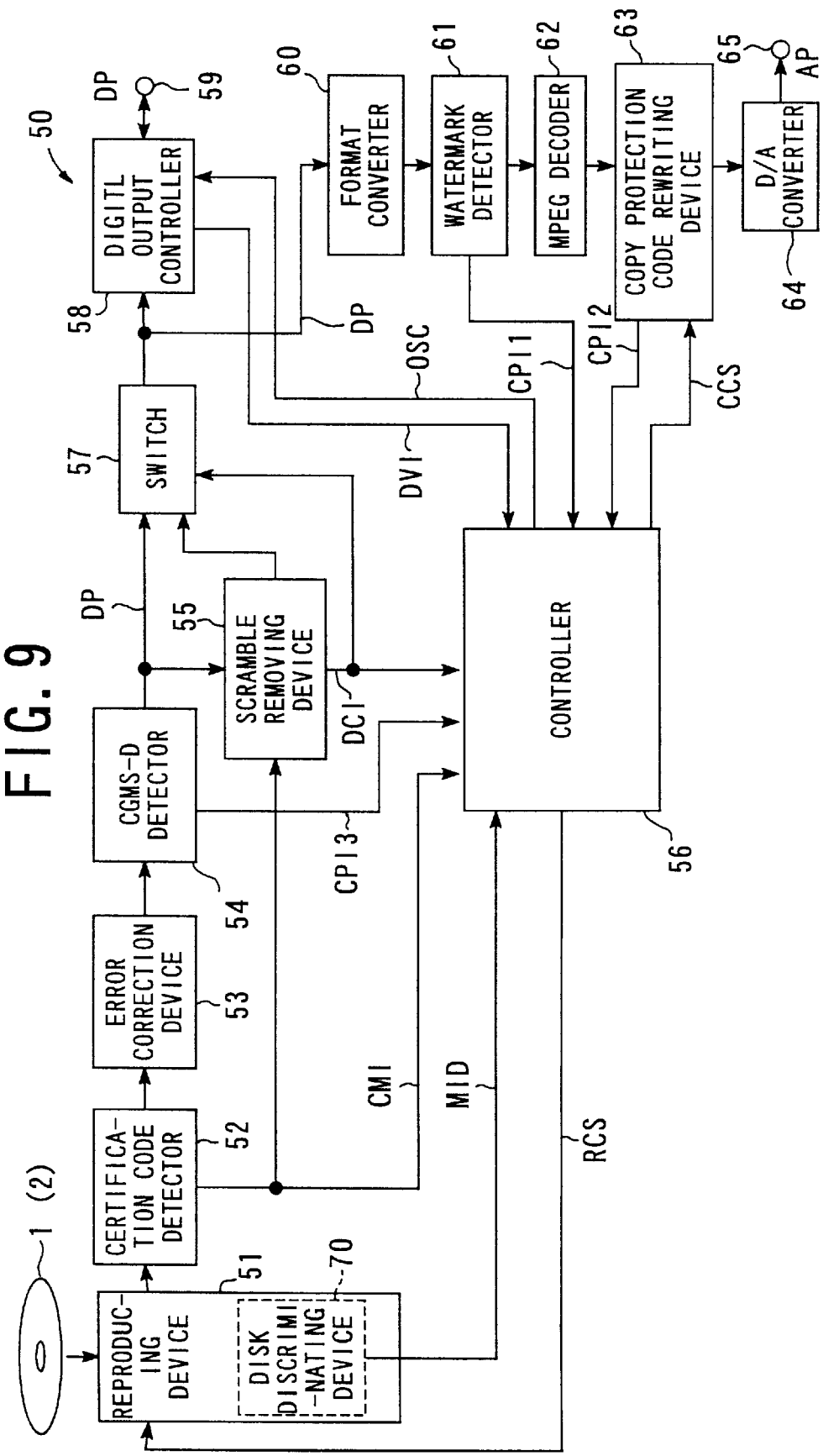
FIG. 9 is a block diagram for showing a reproducing apparatus according to the first embodiment of the present invention.

Referring to FIG. 9, the reproducing apparatus 50 of the first embodiment of the present invention will be explained.

As shown in FIG. 9, the reproducing apparatus 50 is equipped with a reproducing device 51, a certification code detector 52, an error correction device 53, a CGMS-D detector 54, a scramble removing device 55, a controller 56, a switch 57, a digital output controller 58, a digital output terminal 59, a format converter 60, a watermark detector 61, an MPEG decoder 62, a copy protection code rewriting device 63, a digital-analog converter 64, and an analog output terminal 65.

Further, the reproducing apparatus 50 has a disk discriminating device 70. The disk discriminating device 70 is installed in the reproducing device 51. The disk discriminating device 70 is a device for detecting the type of DVD inserted in the receiving device 51. As stated above, there are at least two types of DVD, namely, a read-only DVD and a recordable DVD. More specifically, the recordable DVD exists in some types: a recordable DVD capable of recording information only once, which is referred to as a "DVD-Write Once"; a recording DVD capable of recording information many times, which is referred to as a "DVD-Rewritable" or "DVD-RAM". The disk discriminating device 70 determines whether the DVD to be reproduced by the reproducing apparatus 50 is a read-only DVD or a recordable DVD, and outputs the result of this determination to the controller 56 as a disk discrimination information MID.

When the controller 56 has permitted the reading, the reproducing device 51 reads out the digital video information DP recorded on a DVD, and outputs this digital video information DP to the certification code detector 52. On the other hand, when the controller 56 prohibits the reading, the reproducing device 51 does not read out the digital video information DP. The operation of the reproducing device 51 is controlled by a reading control signal RCS output from the controller 56.

The certification code detector 52 detects whether or not a certification code exists in the digital video information DP read out by the reproducing device 51. When the existence of the certification code has been detected, the certification code detector 52 reads out the certification code from within the digital video information DP,. and outputs certification information CMI corresponding to this certification code to the controller 56. On the other hand, when the existence of the certification code has not been detected, the certification code detector 52 outputs to the controller 56 the information for showing that the certification code has not been detected. As described above, when the scramble removal information is included in the certification code, the certification code detector 52 outputs the scramble removal information to the scramble removing device 55.

The digital video information DP output from the certification code detector 52 is error corrected by the error correction device 53, and is then input to the CGMS-D detector 54. The CGMS-D detector 54 detects CGMS-D from the digital video information DP, and outputs CGMS information CPI3 corresponding to this CGMS-D to the controller 56.

The digital video information DP output from the CGMS-D detector 54 is output to the scramble removing device 55 and the switch 57 respectively. The scramble removing device 55 detects whether the digital video data included in the digital video information DP has been scrambled or not. When the digital video data has been scrambled, the scramble removing device 55 outputs detection information DCI for showing that scramble has been applied, to the controller 56 and the switch 57. At the same time, the scramble removing device 55 removes this scramble and outputs to the switch 57 the digital video information DP from which the scramble has been removed. As explained above, when the scramble removal information is included in the certification code, the scramble removing device 55 removes the scramble by using the scramble removal information output from the certification code detector 52. On the other hand, when the digital video information DP is not scrambled, the scramble removing device 55 outputs the detection information DCI for showing that the scramble has not been applied, to the controller 56 and the switch 57.

The switch 57 is a switch for changing over between the digital video information DP directly output from the CGMS-D detector 54 and the digital video information DP output from the CGMS-D detector 54 through the scramble removing device 55. The switch control of the switch 57 is carried out based on the detection information DCI output from the scramble removing device 55 and the like. Thus, when the digital video information DP has not been scrambled, the digital video information DP output from the CGMS-D detector 54 is output as it is to the digital output controller 58 through the switch 57. On the other hand, when the digital video information DP has been scrambled, the digital video information DP from which the scramble has been removed by the scramble removing device 55 is output to the digital output controller 58 through the switch 57.

The digital output controller 58 is for carrying out the digital output control of the reproducing apparatus 50. The output section of the digital output controller 58 is connected to the digital output terminal 59, and the digital output terminal 59 may be connected to an external apparatus (not shown) through a digital bus (not shown). The digital output controller 58 carries out bi-directional communications through the external apparatus and the digital bus, obtains type information DVI for showing the type of the external apparatus and outputs this type information DVI to the controller 56. This type information DVI is used for reproduction restriction control described later and executed by the controller 56. In the reproduction restriction control, the controller 56 outputs to the digital output controller 58 an output control signal OCS for permitting or prohibiting the digital video information DP to the external apparatus. When the controller 56 has permitted the output, the digital output controller 58 outputs from the reproducing apparatus 50 to the external apparatus the digital video information DP output through the switch 57 in the digital state as it is. On the other hand, when the controller 56 has prohibited the output, the digital output controller 58 does not output the digital video information DP to the external apparatus.

The digital video information DP output from the switch 57 is output to the format converter 60 as well as to the digital output controller 58. The format converter 60 converts the data format of the digital video information DP into a data format for an analog output. When the information read out from the DVD by the reproducing apparatus 51 is information for reproducing a moving picture, for example, sound information and others as well as the digital video information DP are included in the read-out information. In this case, the format converter 60 separates the digital video information DP from the sound information and others. Then, the sound information is output to sound processing circuit not shown.

The digital sound information DP with the converted data format is input to the watermark detector 61. The watermark detector 61 detects the watermark included in the digital video information DP, and outputs the watermark information CPI1 corresponding to this watermark to the controller 56.

The digital video information DP is decoded by a decoding system based on MPEG2 in the MPEG decoder 62, and a decoded result is input to the copy protection code rewriting device 63. When a change control signal CCS is output to the copy protection code rewriting device 63 from the controller 56, the copy protection code rewriting device 63 changes or rewrites the copy protection code included in the digital video information DP from One Copy to Never Copy. When the copy protection code included in the digital video information DP is necessary for the reproduction restriction control to be executed by the controller 56, the copy protection code rewriting device 63 detects a copy protection code before the rewriting, from the MPEG2-combined digital video information DP, and outputs the copy protection information CPI2 corresponding to this copy protection code to the controller 56.

The digital video information DP output from the copy protection code rewriting device 63 is converted from digital to analog information by the digital-analog converter 64, and a result is output to the outside from the analog output terminal 65 as the analog video information AP. With this arrangement, when a monitoring apparatus is connected to the analog output terminal 65, for example, a picture or a video image is displayed in the monitoring apparatus.

Figure 10:
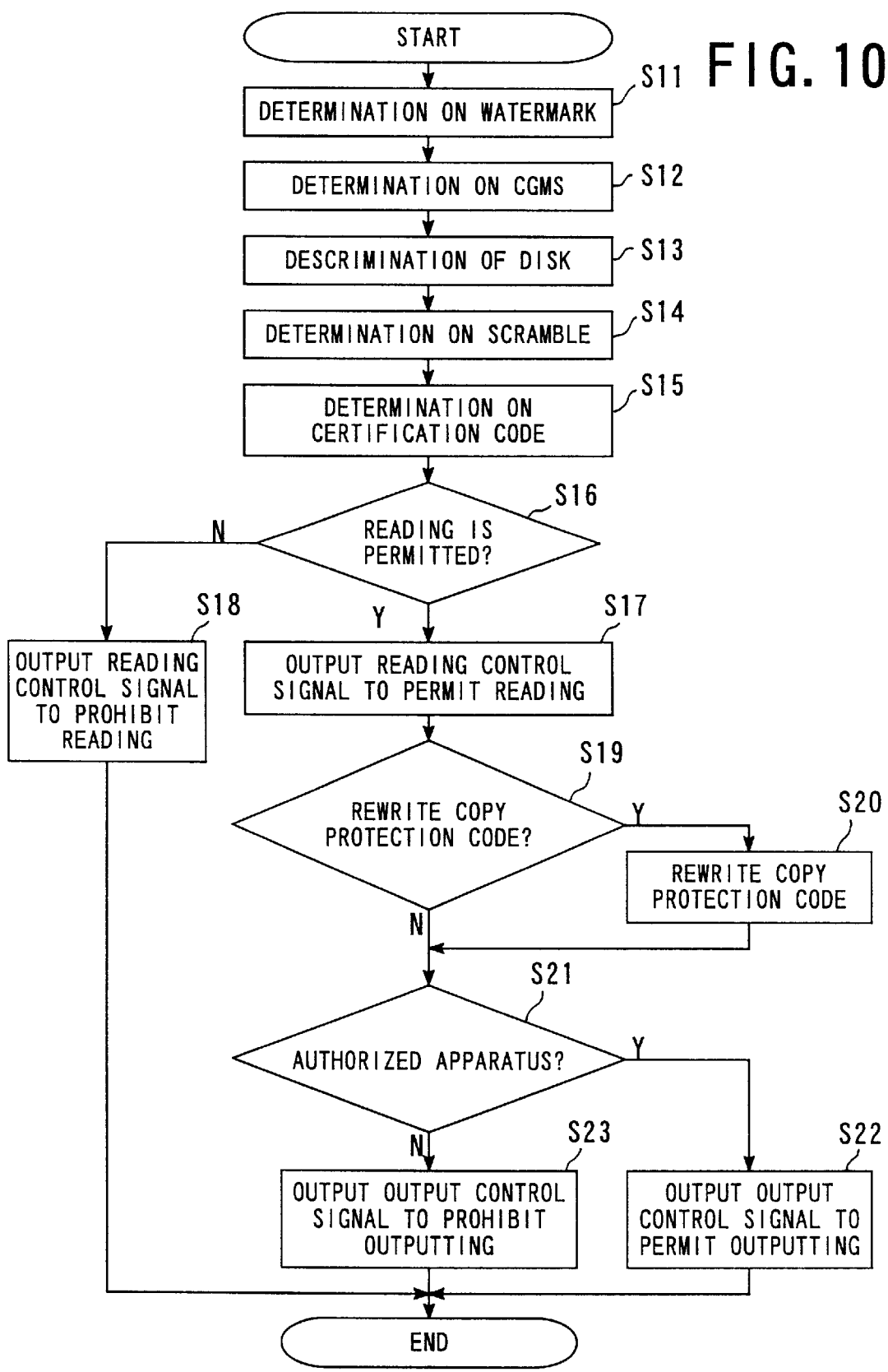
FIG. 10 is a flowchart for showing reproduction restriction control in the first embodiment of the present invention.

Further, the controller 56 is equipped with a CPU, memories, etc., and carries out an overall control of the reproducing apparatus 50 and a reproduction restriction control as shown in FIG. 10.

Referring to FIG. 10, the reproduction restriction control to be carried out by the controller 56 will be explained below.

Firstly, the controller 56 outputs to the reproducing device 51 a reading control signal RCS for permitting the reading. Then, the reproducing device 51 starts the reading of the digital video information DP from a DVD. The controller 56 then executes the reproduction restriction control shown in FIG. 10.

In FIG. 10, the controller 56 determines whether the digital video information DP read out by the reproducing device 51 represents Never Copy, One Copy or Copy Free, based on the watermark information CPI1 output from the watermark detector 61 (step 11). Further, the controller 56 determines whether the digital video information DP read out by the reproducing device 51 represents Never Copy, One Copy or Copy Free, based on the CGMS information CPI3 output from the CGMS-D detector 54 (step 12).

Next, the controller 56 determines whether the DVD to be reproduced by the reproducing apparatus 50 is a read-only DVD or a recordable DVD, on the basis of the disk discrimination information MID output from the disk discriminating device 70 (step 13).

Further, the controller 56 determines whether the digital video data included in the digital video information DP read out by the reproducing device 51 has been scrambled or not, based on the detection signal DCI output from the scramble removing device 55 (step 14). Further, the controller 56 determines whether a certification code has been added to the digital video information DP read out by the reproducing device 51, based on the certification information CMI output from the certification code detector 52 (step 15).

Next, the controller 56 determines whether the reading of the digital video information DP by the reproducing device 51 is permitted or prohibited, based on a result of the determines in steps 11 to 15 (step 16).

When the determination has been made that the reading of the digital video information DP by the reproducing device 51 is permitted (step 16=YES), the controller 56 outputs to the reproducing device 51 the reading control signal RCS for showing the permission of the reading (step 17). Thus, the reproducing device 51 continues the reading of the digital control information DP. Further, the controller 56 determines whether it is necessary or not to change from One Copy to No More Copy the copy protection signal included in the digital video information DP read out by the reproducing device 51, based on results of the determines in steps 11 to 15 (step 19). When the determine has been made that it is necessary to change the copy protection code (step 19=YES), the controller 56 outputs to the copy protection code rewriting device 63 the change control signal CCS for instructing the change (or rewriting) of the copy protection code (step 20). As a result, the copy protection code rewriting device 63 changes from One Copy to No More Copy the copy protection code included in the digital video information DP read out from the reproducing device 51. Then, the digital video information DP with the changed copy protection code is converted into the analog video information AP by the digital-analog converter 64, and this analog video information AP is output to the outside from the analog output terminal 65. As explained above, when the digital video information DP read out from the reproducing device 51 has been scrambled, the scramble is removed by the scramble removing device 55.

On the other hand, in step 19, when the determination has been made that it is not necessary to change the copy protection code (step 19=NO), the controller 56 does not output the change control signal CCS for instructing the changing of the copy protection code. Thus, the copy protection code rewriting device 63 does not change the copy protection code included in the digital video information DP read out from the reproducing device 51. Then, this digital video information DP is converted into the analog video information AP by the digital-analog converter 64, and this analog video information AP is output to the outside as analog information from the analog output terminal 65.

Further, the controller 56 determines whether or not the type of the external apparatus connected to the digital output terminal 59 through the digital bus coincides with the type of an authorized apparatus registered in advance in the memory of the controller 56, based on the type information DVI output from the digital output controller 58 (step 21).

In the reproducing apparatus 50, there has been registered in advance in the memory of the controller 56 type information of authorized apparatuses that can receive the digital video information DP output from the reproducing apparatus 50 and that are not equipped with a function of recording this digital video information DP onto a recording medium. For example, as an authorized apparatus, a digital monitoring apparatus is registered in the memory of the controller 56.

Then, as a result of the determination in step 21, when the external apparatus connected to the digital output terminal 59 through the digital bus coincide with any one of the authorized apparatuses registered in advance in the memory of the controller 56 (step 21=YES), the controller 56 outputs to the digital output controller 58 the output control signal OCS for showing the permission of digital output of the digital video information DP (step 22). Thus, the digital output controller 58 outputs the digital video information DP from the digital output terminal 59 to the external apparatus. In this case, the digital video information DP read out by the reproducing device 51 is not only output as analog information from the analog output terminal 65, but is also output as digital information from the digital output terminal 59.

On the other hand, as a result of the determination in step 21, when the external apparatus connected to the digital output terminal 59 through the digital bus do not coincide with the any one of the authorized apparatuses registered in advance in the memory of the controller 56 (step 21=NO), the controller 56 outputs to the digital output controller 58 the output control signal OCS for showing the prohibition of digital output of the digital video information DP (step 23). Thus, the digital video information DP read out by the reproducing device 51 is output as analog information but is not output as digital information.

Further, in step 16, when the determination has been made that the reading of the digital video information DP by the reproducing device 51 is prohibited (step 16=NO), the controller 56 outputs to the reproducing device 51 the reading control signal RCS for showing the prohibition of the reading (step 18). Thus, the reading of the digital video information DP by the reproducing device 51 is stopped.

Accordingly, the digital video information DP is not output as either analog information or digital information.

Referring next to FIGS. 11A and 11B, the statuses of the watermark, the CGMS, etc. included in the digital video information DP read out by the reproducing device 51, types of DVD and the controls executed to these statuses by the controller 56 will be explained.

A control management table for showing a relationship between the statuses of the watermark, CGMS, etc., types of DVD and the controls executed to these statuses by the controller 56 is shown in FIGS. 11A and 11B. The table shown in FIG. 11A is the left part of the control management table. The table shown in FIG. 11B is the right part of the control management table. Each part of the table has 19 rows which are numbered. Between FIGS. 11A and 11B, the rows with the same number correspond to each other. The control management table is stored in the memory of the controller 56, and the controller 56 carries out the reproduction restriction control by using this control management table.

As shown in the first row of the control management table in FIGS. 11A and 11B, when both the watermark and CGMS represent Never Copy, the controller 56 recognizes that the digital video information DP read out from a DVD is Never Copy. Further, as shown in the first row of the control management table, when the DVD to be reproduced by the reproducing apparatus 50 is a read-only DVD, the controller 56 recognizes that the DVD to be reproduced is a read-only DVD on which Never Copy digital video information is recorded in advance. For example, the controller 56 recognized that the DVD to be reproduced is a read-only DVD on which a moving picture is recorded in advance and which is sold in the market. Further, as shown in the first row of the control management table, when the external apparatus connected to the digital output terminal 59 of the reproducing apparatus 50 do not coincide with any one of the authorized apparatuses, the controller 56 recognizes that there is a potential that the external apparatus has a function of recording the digital video information DP in the digital state. In this case, the controller 56 outputs to the reproducing device 51 the reading control signal RSC for showing the permission of the reading, and outputs to the digital output controller 58 the output control signal OCS for showing the prohibition of digital output of the digital video information DP. Thus, the Never Copy digital video information DP is converted into the analog video information AP and output to the external apparatus as an analog signal. However, the digital output of the digital video information DP is not done. Accordingly, the audience can watch the image or picture corresponding to the output analog video information AP with an analog monitor connected to the analog output terminal 65 for example. However, the audience cannot copy the Never Copy digital video information DP, if he or she try to copy the digital video information DP with a recording apparatus connected to the digital output terminal 59. Consequently, the reproducing apparatus 50 can prevent the copying of the Never Copy digital video information DP by digital transmission.

On the other hand, as shown in the second row of the control management table, when the external apparatus connected to the digital output terminal 59 coincides with any one of the authorized apparatuses, the controller 56 recognizes that the external apparatus is not equipped with a function of recording the digital video information DP as digital information. In this case, the controller 56 outputs to the digital output controller 58 the output control signal OCS for showing the permission of digital output of the digital video information DP. Thus, the Never Copy digital video information DP is converted into the analog video information AP, and is output as analog information, and at the same time, the information is output as digital information. Accordingly, in a case where the authorized apparatus connected to the digital output terminal 59 is a digital display device or digital monitor, the audience can watch the image or picture corresponding to the Never Copy digital video information DP with the digital display device or digital monitor.

Further, as shown in the third row of the control management table, when both of the watermark and the CGMS represent Never Copy, but when the DVD to be reproduced by the reproducing apparatus 50 is a recordable DVD, the controller 56 recognizes that the Never copy digital video information DP has been unfairly copied regardless of that this information is Never Copy. The Never Copy digital video information DP is always recorded on a read-only DVD, because it is prohibited that an ordinary person records the Never Copy digital video information onto a recordable DVD. Therefore, the fact that the Never Copy digital video information has been recorded on a recordable DVD is abnormal. In such a case, it is expected that the illegal or unfairly copying was done. In this case, the controller 56 outputs to the reproducing device 51 the reading control signal RSC for showing the prohibition of the reading. Therefore, the Never Copy digital video information DP that has been unfairly copied is not read out by the reproducing device 51. Accordingly, as for such an unfairly copied digital video information, the reproducing apparatus 50 does not carried out any outputting operation. No information is output from the digital output terminal 59 or the analog output terminal 65.

Further, as shown in the seventh row of the control management table, when the watermark represents One Copy and the CGMS represents Never Copy, the controller 56 recognizes that the digital video information DP read out from a DVD is No More Copy. Further, as shown in the seventh row of the control management table, when the digital video information DP has been scrambled and a certification code exists within the digital video information DP, the controller 56 recognizes that the digital video information DP read out from the DVD is information recorded by the recording apparatus 10. Further, as shown in the seventh row of the control management table, when the external apparatus connected to the digital output terminal 59 of the reproducing apparatus 50 do not coincide with any one of the authorized apparatuses, the controller 56 recognizes that there is a potential that the external apparatus has a function of recording the digital video information DP in the digital state. In this case, the controller 56 outputs to the reproducing device 51 the reading control signal RSC for showing the permission of the reading, outputs to the digital output controller 58 the output control signal OCS for showing the prohibition of digital output of the digital video information DP, and outputs the change control signal CCS to the copy protection code rewriting device 63. Thus, the copy protection code of the No More Copy digital video information DP is converted from One Copy to No More Copy, and this information is converted into the analog video information AP and is output as analog information. Accordingly, the audience cannot copy the No More Copy analog video information AP by connecting the recording apparatus 10 to the analog output terminal 65 of the reproducing device 50. This is because the recording apparatus 10 detects the copy protection code changed into No More Copy, and does not carry out the recording. As explained above, according to the recording/reproducing system 100 of the present embodiment, it is possible to prevent the No More Copy digital video information DP from being copied by analog transmission.

On the other hand, as shown in the eighth row of the control management table, when the external apparatus connected to the digital output terminal 59 of the reproducing apparatus 50 coincide with any one of the authorized apparatuses, the controller 56 recognizes that the external apparatus is not equipped with a function of recording the digital video information DP as digital information. In this case, the controller 56 outputs to the digital output controller 58 the output control signal OCS for showing the permission of digital output of the digital video information DP. Thus, the No More Copy digital video information DP is converted into the analog video information AP, and is output as analog information, and at the same time, the information is output as digital information.

Further, as shown in the tenth row of the control management table, when the watermark represents One Copy and the CGMS represents Never Copy, the controller 56 recognizes that the digital video information DP read out from a DVD is No More Copy. However, as shown in the tenth row of the control management table, when the digital video information DP has not been scrambled, the controller 56 recognizes that this digital video information DP is information recorded on the DVD by a non-compliant recording apparatus other than the recording apparatus 10. The non-compliant recording apparatus refers to other recording apparatus which is not based on a predetermined rule on the copy protection that prescribes the watermark included in the digital video information DP or analog video information AP, the copy protection code and the CGMS together with their respective dispositions, the decision method, the scramble processing method and the scramble removing method, and the like. In this case, the controller 56 outputs to the reproducing device 51 the reading control signal RCS for prohibiting the reading. Thus, the digital video information DP recorded by the non-compliant recording apparatus is neither reproduced nor output. Accordingly, a person who has copied the digital video information DP by the non-compliant recording apparatus cannot reproduce this copied digital video information DP by the reproducing apparatus 50, and can obtain no benefit from the copying. This person feels inconvenience. As a result, it is possible to reduce unlimited copying of the digital video information DP or analog video information AP carried out by the non-compliant recording apparatus or non-compliant reproducing apparatus.

Further, as shown in the seventeenth row of the control management table, both of the watermark and the CGMS represent Copy Free and the DVD to be reproduced is a read-only DVD, the controller 56 recognizes that the digital video information read out from the DVD is Copy Free. In this case, the controller 56 outputs to the reproducing device 51 the reading control signal RCS for showing the permission of the reading, and outputs to the digital output controller 58 the output control signal OCS for showing the permission of digital output of the digital video information DP. Thus, the Copy Free digital video information DP is converted into the analog video information AP and is output as analog information. Also, it is output as digital information.

Further, as shown in the nineteenth row of the control management table, when both the watermark and CGMS represent Copy Free and the DVD to be reproduced is a recordable DVD, the controller 56 recognizes that the digital video information DP read out from the DVD is Copy Free. Further, the controller 56, as shown in the nineteenth row of the control management table, confirms that the digital video information DP is not scrambled. Thus, the controller 56 recognizes that the digital video information DP is normal. In this case, the controller 56 carries out control similar to that shown in the seventeenth row of the control management table. Accordingly, the digital video information DP is output not only as analog information but also as digital information.

Further, when there is conflict between the statuses of the watermark and the CGMS, as shown in the fourth, fifth, eleventh, twelfth or sixteenth row; when there is no certification code, nevertheless but the digital video information DP has been scrambled, as shown in the ninth row; or when both the watermark and the CGMS represent Copy Free, nevertheless but the digital video information has been scrambled, as shown in the eighteenth row; the controller 56 recognizes that the digital video information DP with a potential of the information having being altered illegally or unfairly has been recorded on the DVD. In this case, the controller 56 outputs to the reproducing device 51 the reading control signal RCS for prohibiting the reading. Thus, it is possible to prevent the digital video information DP having the potential of illegal alteration from being reproduced and output to the outside from the reproducing apparatus 50.

In the thirteenth to fifteenth rows of the control management table, the watermark represents Copy Free and the CGMS represents Never Copy. In this case, the controller 56 carries out controls similar to those in the first to third rows of the control management table.

V. Disk Discriminating Device

Figure 12:
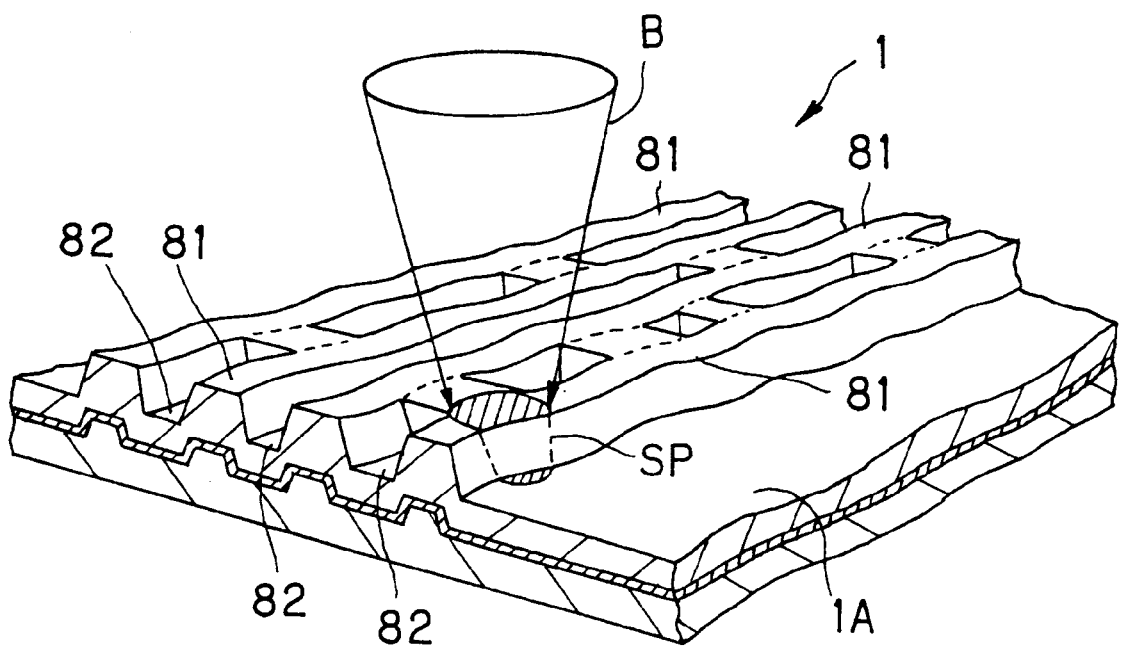
FIG. 12 is a diagram showing a part of a recordable DVD on which a groove track and a land track are formed.
Figure 13:
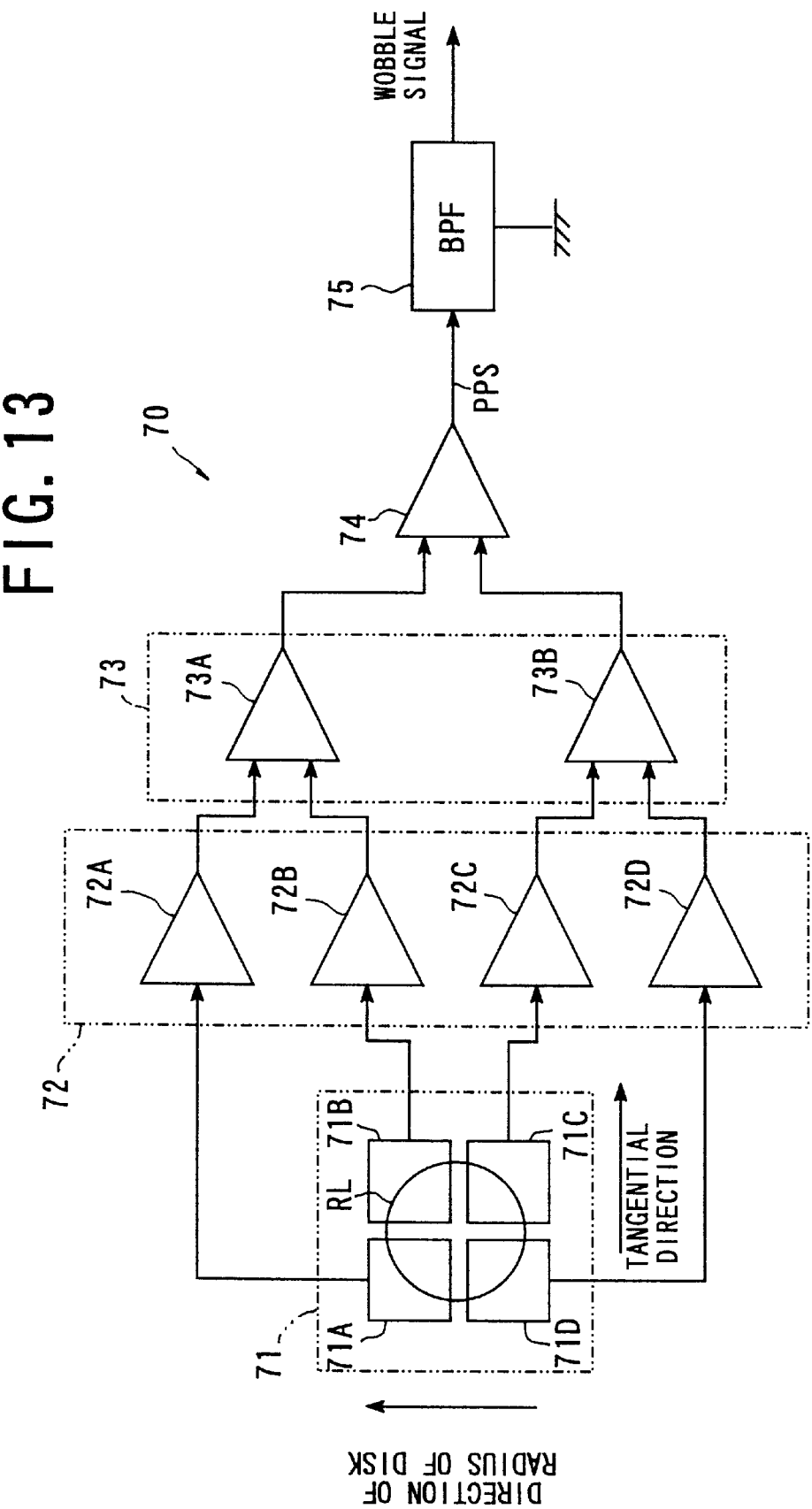
FIG. 13 is a diagram for showing a disk discriminating device according to the first embodiment of the present invention.

Referring next to FIGS. 12 and 13, the disk discriminating device installed in the reproducing device 51 will be explained.

The disk discriminating device 70 of the first embodiment of the present invention detects a form of a track formed on the information recording surface of the DVD, and determines whether or not the track has wobble. On the basis of this determination, the disk discrimination device 70 determines whether the DVD is a read-only DVD or a recordable DVD.

More specifically, in the read-only DVD, the track is pre-formed on the information recording surface thereof, and extends in the form of a spiral. Phase pits corresponding to the digital video information DP (RF signal) and other necessary information are formed on this track. In the read-only DVD, the track does not have the wobble.

On the other hand, in the recordable DVD 1, as shown in FIG. 12, a groove track 81 and a land track 82 are pre-formed on the information recording surface 1A thereof, and extend in the form of a spiral, respectively. The phase pits corresponding to the digital video information DP and other necessary information are formed on the groove track 81 (not shown). The land track 82 functions as means for guiding the light beam. In the recordable DVD, the groove track 81 has the wobble. Namely, the groove track 81, as shown in FIG. 12, is wobbling. This is the wobble. The frequency of the wobble corresponds to the rate of the rotation of the DVD 1. The wobble is used as rotation control information when the recording apparatus controls the rate of the rotation of the DVD 1. In addition, for the sake of ease of understanding, in FIG. 12, a protection layer formed on the information recording surface 1A is omitted.

Thus, the track of the recordable DVD has the wobble, while the track of the read-only DVD does not have the wobble. Therefore, by detecting presence or absence of the wobble, it is possible to discriminate between the recordable DVD and the read-only DVD.

FIG. 13 shows the disk discriminating device 70 having a quarter-divided type photo detector 71. The photo detector 71 has four detecting portion 71A, 71B, 71C and 71D. When the detecting portions are irradiated with a light beam RL reflected by the surface of the DVD 1, the detecting portions 71A, 71B, 71C and 71D output detection signals Ia, Ib, Ic and Id, respectively. Each detection signal Ia, Ib, Ic, Id represents the amount of the corresponding part of the light beam RL.

The detection signals Ia, Ib, Ic and Id are fed into a converting portion 72. The converting portion 72 includes four converters 72A, 72B, 72C and 72D. Each converter 72A, 72B, 72C, 72D carries out a current-voltage conversion on the input detection signal, and supplies an output to a adding portion 73. The adding portion 73 includes two adders 73A and 73B. The adder 73A adds two signals supplied from the converters 72A and 72B. The adder 73B adds two signals supplied from the converters 72C and 72D. A subtracter 74 subtracts an output of the adder 73B from an output of the adder 73A, and outputs a push-pull signal PPS. Thus, the push-pull signal PPS is given as the following equation.

$$PPS=(Ia+Ib)-(Ic+Id)$$

This push-pull signal includes a tracking error signal which is used for a tracking servo control and a wobble signal. Since the tracking error signal and the wobble signal are different in frequency from each other, the wobble signal can be extracted from the push-pull signal PPS with a band pass filter (BPF) 75.

If the wobble signal is extracted, the disk discriminating device determines that the DVD to be reproduced by the reproducing apparatus 50 is a recordable DVD, and outputs the result of this determination to the controller 56 as the disk discrimination information MID.

Thus, the disk discriminating device 70 can discriminate between a read-only DVD and a recordable DVD on the basis of presence or absence of the wobble. Therefore, the disk discrimination can be easily carried out.

VI. Copy Restriction by the Recording/reproducing System

According to the recording/reproducing system 100 of the present embodiment, it is possible to properly restrict the copying of the digital video information DP carried out by using the recording apparatus 10 and the reproducing apparatus 50.

Figure 14:
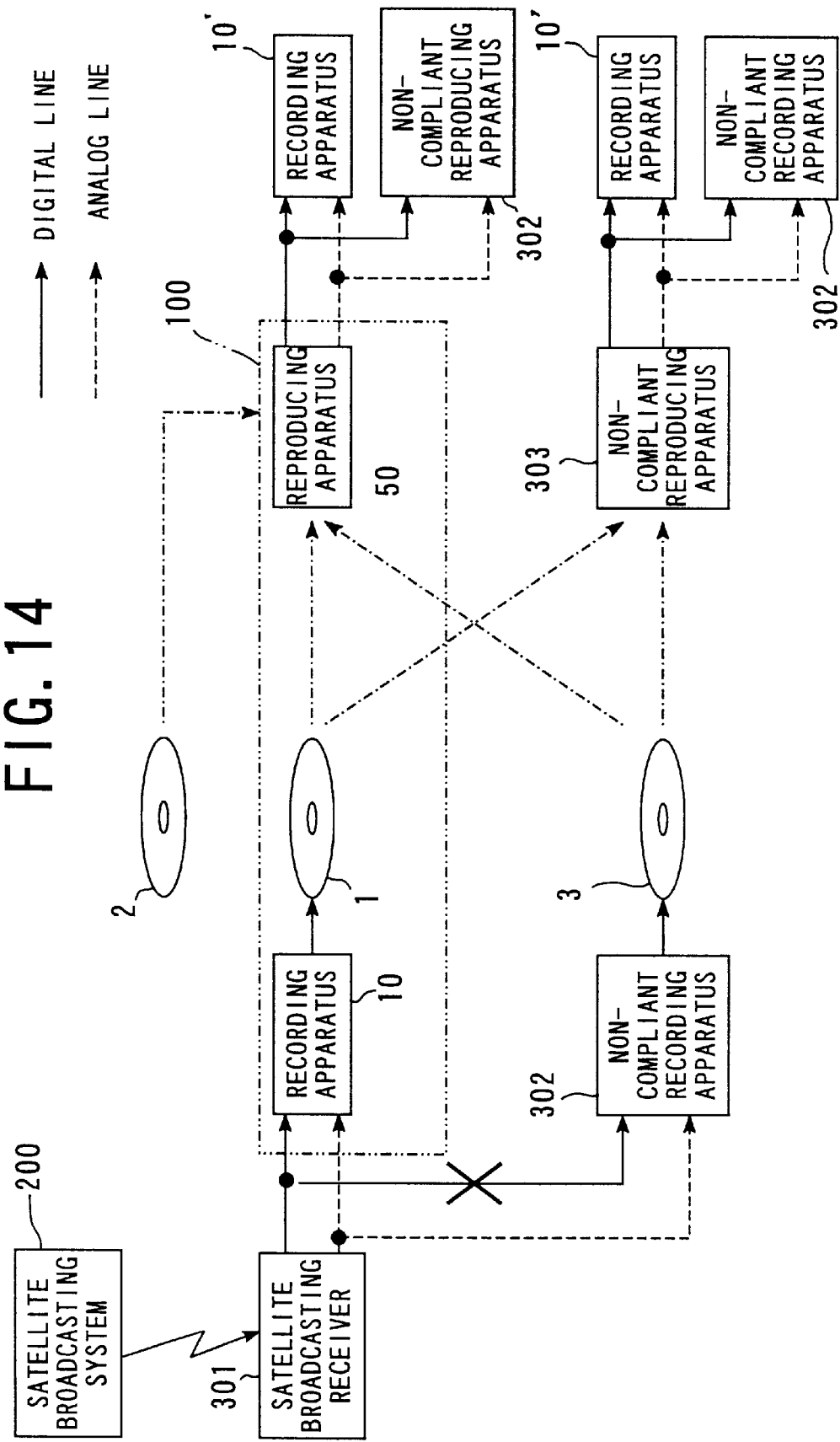
FIG. 14 is a block diagram for showing a recording/reproducing system, a satellite broadcasting system, a non-compliant recording apparatus, a non-compliant reproducing apparatus, etc. in the first embodiment of the present invention.

As shown in FIG. 14, it is possible to restrict properly the copying of the digital video information DP carried out, for example, in the following routes: (1) Take the digital video information DP transmitted from the satellite broadcasting system 200 into the recording apparatus 10 through the satellite broadcasting receiver 301; (2) Record this digital video information DP or the analog video information AP converted by the satellite broadcasting receiver 301, onto the DVD1 by the recording apparatus 10; (3) Reproduce by the reproducing apparatus 50 the digital video information DP recorded on the DVD1; and (4) Further record the digital video information DP or analog video information AP output from the reproducing apparatus 50, onto other DVD by another recording apparatus 10' connected to the reproducing apparatus 50.

Particularly, when the No More Copy digital video information DP is converted into the analog video information AP and this analog information is output from the reproducing apparatus 50 to the recording apparatus 10' connected to the output terminal 65 of the reproducing apparatus 50, the copy protection code included in the No More Copy digital video information DP is changed from One Copy to No More Copy by the reproducing apparatus 50. Therefore, it is possible to prevent the No More Copy digital video information DP from being copied by the recording apparatus 10'.

Further, according to the recording apparatus 10 of the present embodiment, One Copy digital video information DP is recorded onto the DVD1 after the information has been scrambled. Accordingly, it is possible to prevent the digital video information DP, which has been changed from One Copy to No More Copy by the recording onto the DVD1, from being reproduced by the non-compliant reproducing apparatus not equipped with the copy protection function. Therefore, it is possible to prevent the No More Copy digital video information DP from being copied by this non-compliant reproducing apparatus.

When, for example, as shown in FIG. 14, an attempt has been made by a person to (1) take the digital video information DP transmitted from the satellite broadcasting system 200 into the recording apparatus 10 through the satellite broadcasting receiver 301, (2) record this digital video information DP or the analog video information AP converted by the satellite broadcasting receiver 301, onto the DVD1 by the recording apparatus 10, and (3) reproduce by a non-compliant reproducing apparatus 303 the digital video information DP recorded on the DVD1, the non-compliant reproducing apparatus 303 cannot remove the scramble applied to the digital video information DP. Therefore, it is not possible to reproduce this digital video information DP.

Further, the reproducing apparatus 50 of the embodiment of the present invention has the disk discriminating device 70 for discriminating the type of DVD, a read-only DVD or a recordable DVD. Therefore, by using the watermark, the CGMS, and the discrimination of the type of DVD, the reproducing apparatus 50 can recognize the fact that the Never Copy digital video information DP has been recorded on a recordable DVD regardless of that this information is Never Copy.

At least two cases are assumed as a case where the Never Copy digital video information DP can be recorded on a recordable DVD. One is a case where the RF signal recorded on one DVD is directly copied to another DVD. The other is a case where the digital video information recorded on one DVD is copied to another DVD by using a non-compliant or unauthorized recording apparatus. If each case has happened, the reproducing apparatus 50 can prevent the reproduction and the output of such an illegally or unfairly copied digital video information.

Further, according to the reproducing apparatus 50 of the present embodiment, the reproducing apparatus 50 is so structured that, when an attempt is made to reproduce No More Copy digital video information DP, the reproducing apparatus 50 recognizes that this digital video information DP is not the information recorded by the recording apparatus 10 when this digital video information DP has not been scrambled or when a certification code is not added to this digital video information DP. Thus, the reproducing apparatus 50 does not reproduce this digital video information DP. Therefore, there are the following effects. As a person who has copied the digital video information DP onto a DVD by the non-compliant recording apparatus cannot reproduce the copied digital video information DP by the reproducing apparatus 50, he or she cannot obtain any benefit from the copying of this digital video information DP, and feels inconvenience. As a result, it is possible to reduce unlimited copying of the digital video information DP or analog video information AP carried out by the non-compliant recording apparatus or non-compliant reproducing apparatus.

When, for example, as shown in FIG. 14, an attempt has been made by a person to (1) take the digital video information DP transmitted from the satellite broadcasting system 200 into a non-compliant recording apparatus 302 through the satellite broadcasting receiver 301, (2) record this digital video information DP or the analog video information AP converted by the satellite broadcasting receiver 301, onto a DVD3 by the non-compliant recording apparatus 302, and (3) reproduce by the reproducing apparatus 50 the digital video information DP recorded on the DVD3, the reproducing apparatus 50 does not reproduce this digital video information DP. As a result, the audience cannot watch by the reproducing apparatus 50 a moving picture transmitted from the satellite broadcasting system 200 even though the audience has recorded this moving picture onto the DVD3 by using the non-compliant recording apparatus 302.

Further, according to the recording apparatus 10 and the reproducing apparatus 50 of the present embodiment, as the recording or reproduction of the digital video information DP is prohibited when there is a contradiction among the watermark, the copy protection code, the CGMS, etc. included in the digital video information DP, it is possible to prevent the digital video information DP having the potential of illegal alteration from being recorded, reproduced or copied.

B. Second Embodiment

Figure 15:
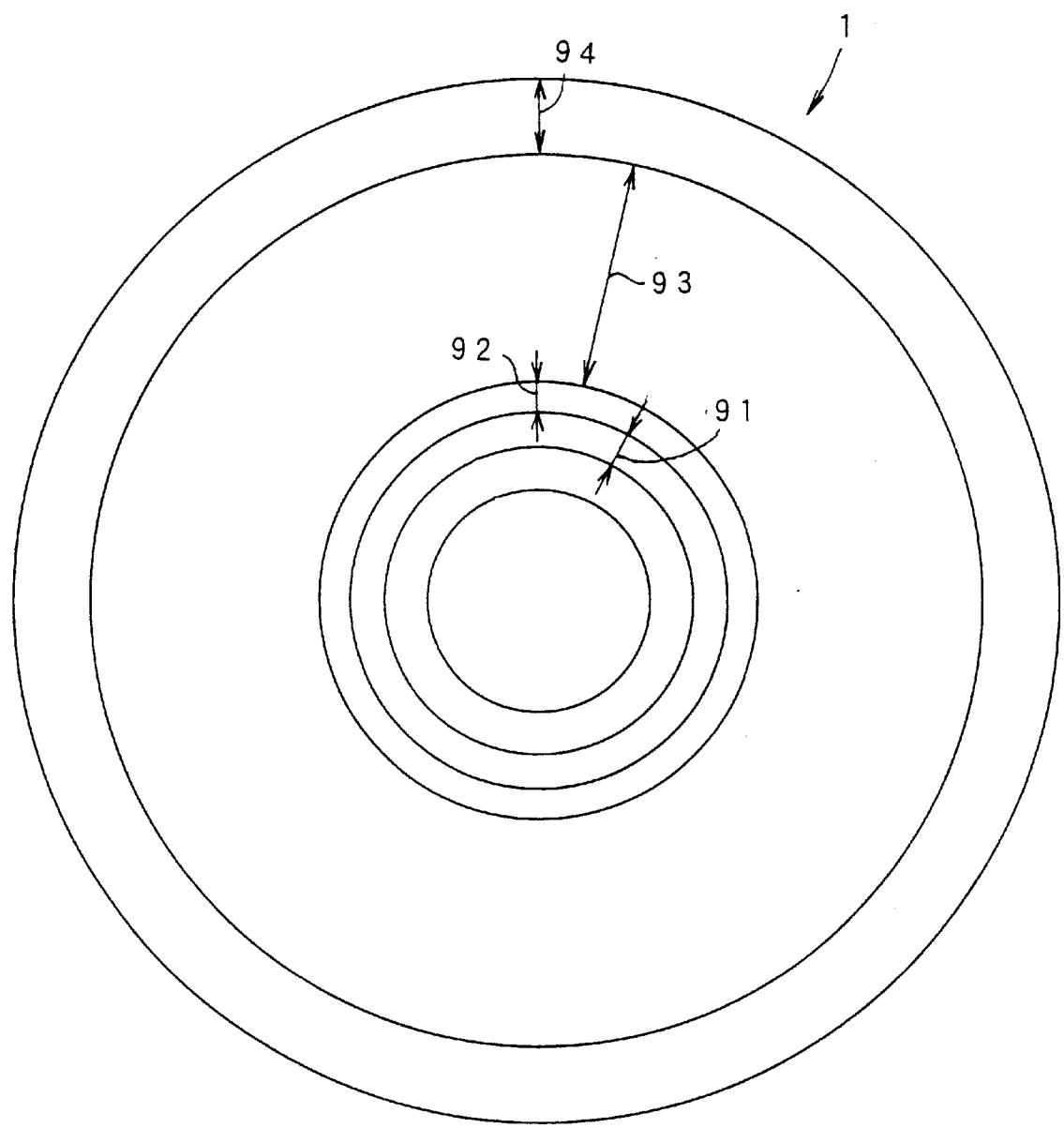
FIG. 15 is a diagram showing a lead-in area, a lead-out area and a recording area on a DVD in a second embodiment of the present invention.
Figure 16:
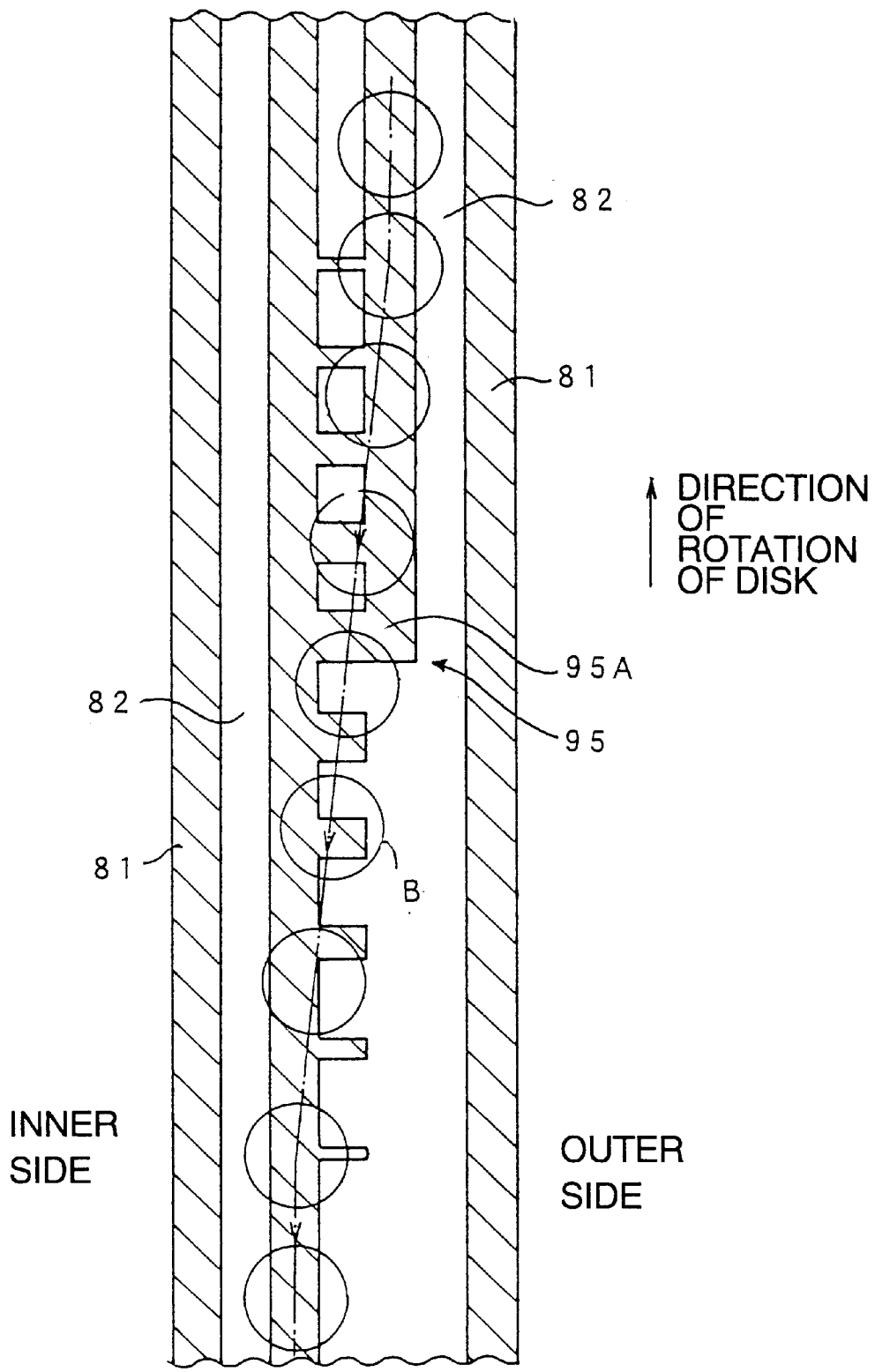
FIG. 16 is an enlarged view showing a loop track formed on a DVD according to the second embodiment of the present invention.
Figure 17:
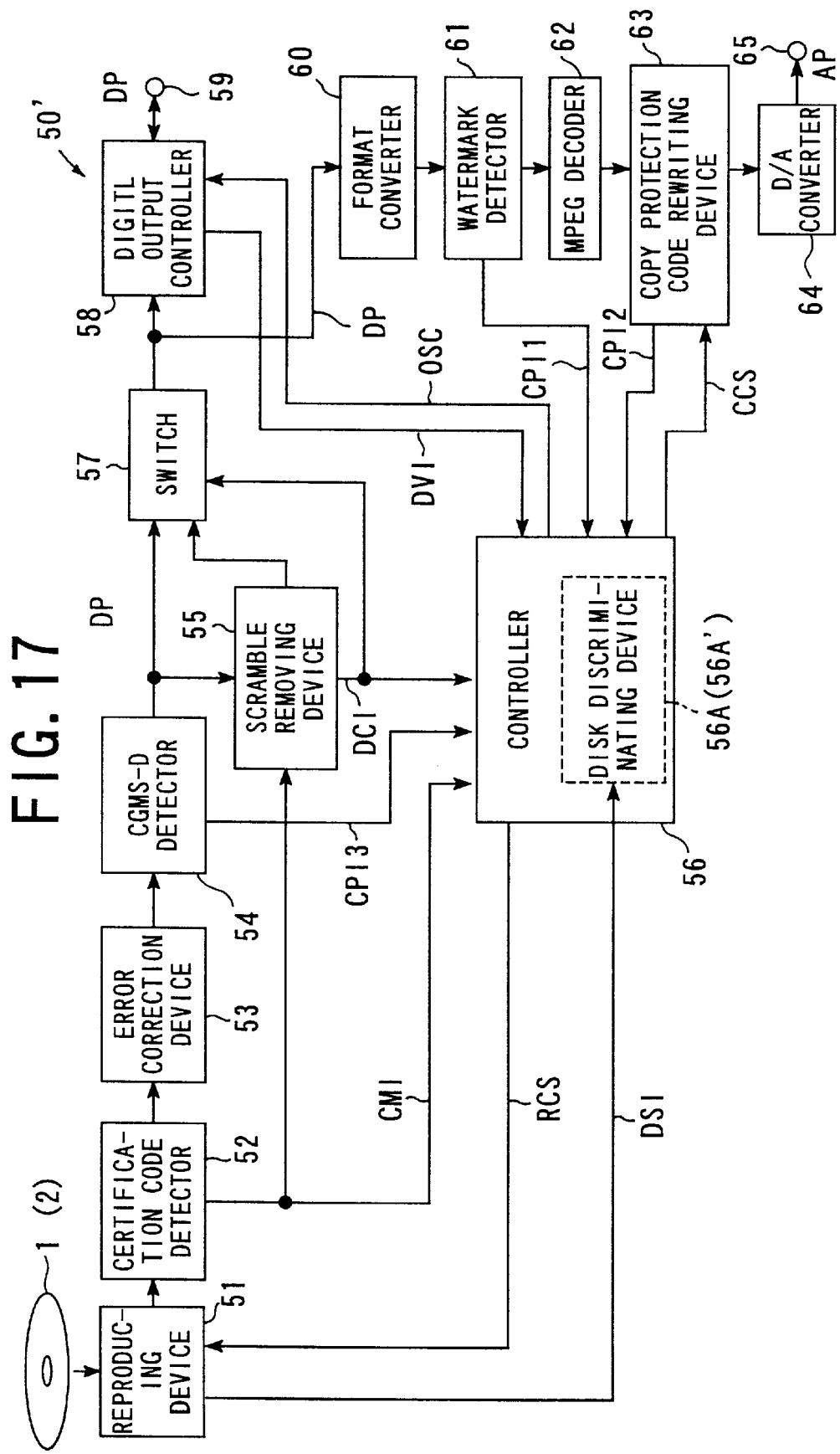
FIG. 17 is a block diagram for showing a reproducing apparatus according to the second embodiment or a third embodiment of the present invention.

Referring to FIGS. 15 through 17, a second embodiment of the present invention will be described. In this embodiment, the disk discrimination is carried out on the basis of a loop track which is formed on the information recording surface of the recordable DVD.

As shown in FIG. 15, in the information recording surface 1A of a recordable DVD 1, a recording control area 91, a lead-in area 92, a recording area 93 and a lead-out area 94 are formed from the inner side to the outer side of the DVD 1 in this order.

Information for setting an intensity of the light beam and other necessary control information are recorded in the recording control area 91. Physical format information, disk production information, etc. are recorded in the lead-in area 92. The digital video information DP and other digital information are recorded as the RF signal in the recording area 93. Information necessary for operations at the time of the end of recording or reproduction is recorded in the lead-out area 94.

The groove track 81 and the land track 82 shown in FIG. 12 are formed in each of the areas 91, 92, 93 and 94 (not shown in FIG. 15). The groove track 81 and the land track 82 extend from the inner side to the outer side in the form of a spiral on the information recording surface 1A of the DVD 1.

Further, within the lead-in area 92, a plurality of loop tracks are formed at intervals of 5 laps of the groove track 81 for example. As shown in FIG. 16, the loop track is formed by connecting two portions of the groove track 81 to each other. More specifically, a connecting portion 95A whose height is the same as that of the groove track 81 is formed on the land track 82, and two portions of the groove track 81 adjacently located in the direction of the radius of the DVD 1 are connected to each other with the connecting portion 95A, as shown in FIG. 16. As a result, a loop is formed in the groove track 81. This is the loop track 95. In addition, for the sake of ease of understanding, the wobble is omitted in FIG. 16.

The loop track 95 is formed for the purpose of preventing the digital video information DP from unlimitedly copying with a non-compliance recording apparatus, which is not equipped with a mechanism for restricting of the copying of the digital video information DP.

In recording the digital video information DP onto a recordable DVD 1, a recording apparatus rotates the DVD 1, and emits a light beam to the rotating DVD 1. Further, the recording apparatus carries out a servo control in such a way that the light spot traces the groove track 81. In addition, the light spot means an emitting point of the focused light beam on the surface of the DVD 1.

If there is no loop track 95 in the groove track 81, the light spot is moved from the inner side to the outer side of the DVD 1 along the groove track 81, because the groove track 81 is in the form of a spiral. However, if there is the loop track 95 in the groove track 81, the movement of the light spot is stopped by the loop track 95. If the light spot reaches the loop track 95, the light spot traces the loop track 95 repeatedly. Since the loop track 95 is in the form of a loop, the light spot cannot go out of the loop track 95. Therefore, the digital video information DP cannot be normally recorded onto the groove track 81. Thus, it is possible to prevent the digital video information DP from unlimitedly copying by a non-compliant recording apparatus.

On the other hand, the compliant recording apparatus, i.e., the recording apparatus 10 of the system 100 knows positions at which the loop tracks 95 are formed. For example, the recording apparatus 10 has information to indicate the positions at which the loop tracks 95 are formed. Therefore, in recording the digital video information DP onto the recordable DVD 1, the recording apparatus 10 can control the movement of the light spot so as to make the light spot jump over the loop track 95. Accordingly, the recording apparatus 10 can normally record the digital video information onto the recordable DVD 1 having the loop tracks 95.

Meanwhile, the loop tracks 95 are formed only in a recordable DVD. Therefore, by detecting presence or absence of the loop track 95, it can be determined whether the DVD is a recordable DVD or a read-only DVD.

In FIG. 17, the reproducing apparatus 50' of the second embodiment of the present invention detects presence or absence of the loop track 95 on the DVD 1, and determines on the basis of the result of this detection whether or not the DVD 1 is a recording DVD or a read-only DVD. More specifically, when starting reproduction of the DVD 1, the reproducing device 51 obtains information recorded within an area corresponding to five laps of the groove track 81 from a predetermined address in the lead-in area 92, and outputs the obtained information to the controller 56 as a disk discrimination information DSI. The controller 56 determines at the disk discriminating portion 56A whether or not there is any error in the information obtained from the reproducing device 51. If there is no error, the controller 56 determines that the DVD to be reproduced by the reproducing apparatus 50' is a read-only DVD. If there is any error, the controller 56 determines that the DVD is a recordable DVD. In addition, when determination of the type of DVD, the recording apparatus 10 does not carried out the control of the movement of the light spot so as to make the light spot jump over the loop track 95.

Thus, according to the second embodiment of the present invention, the disk discrimination can be easily carried out by detecting presence or absence of the loop track 95.

C. Third Embodiment

Figure 18:
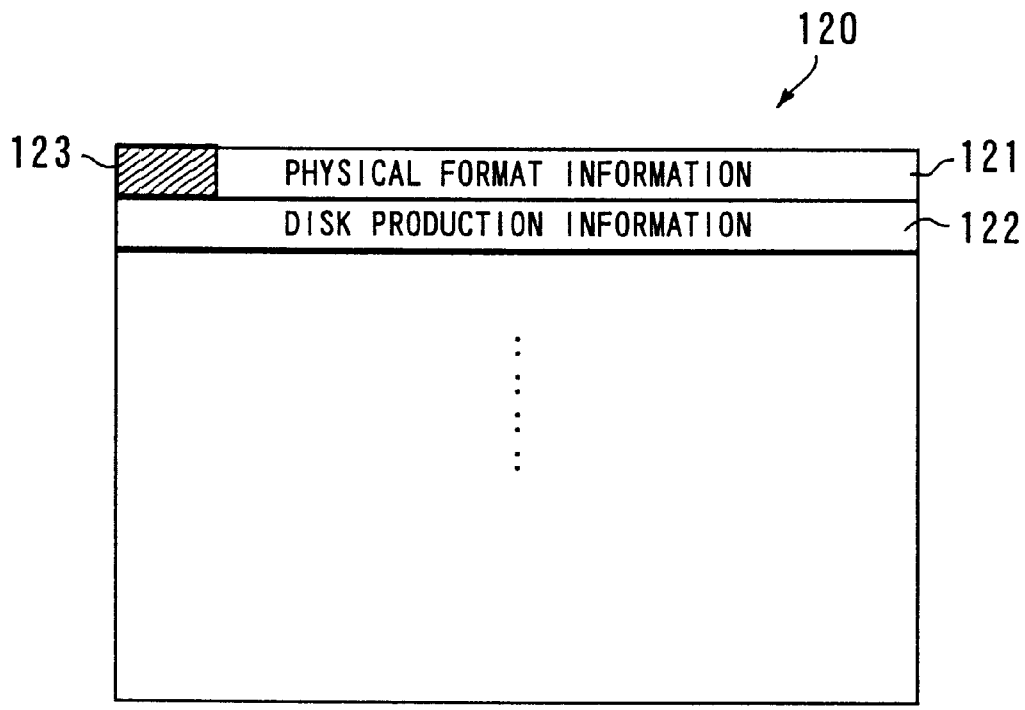
FIG. 18 is a diagram for showing a control data block recorded on a DVD in the third embodiment of the present invention.
Figure 19:
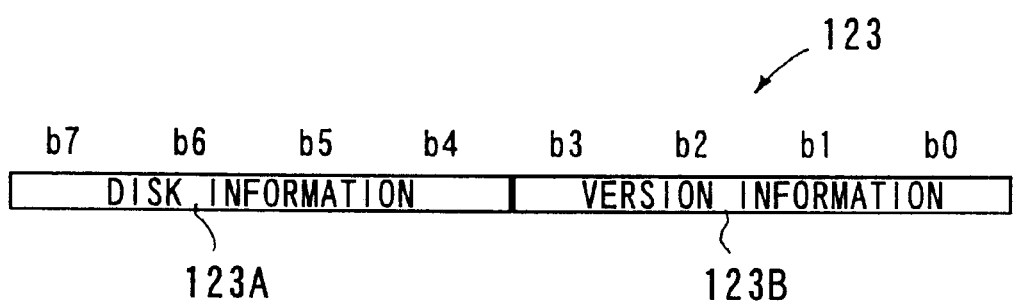
FIG. 19 is a diagram for showing disk information and version information contained in the control data block in the third embodiment of the present invention.

Referring to FIGS. 18 and 19, a third embodiment of the present invention will be described. In this embodiment, the disk discrimination is carried out on the basis of the disk information recorded on the lead-in area of the DVD.

As stated above, the lead-in area is formed on the information recording surface of the DVD. Further, a control data block 120 is recorded in the lead-in area. The control data block 120 is shown in FIG. 18. As shown in FIG. 18, the control data block 120 includes physical format information 121, disk production information 121 and other management information. Further, the disk production information 121 includes the disk information 123A and version information 123B. These information 123A and 123B are recorded at the lead portion 123 of the physical format information 121. The version information 123B represents the version of a DVD standard.

The disk information 123A is called a book type, and represents a standard with which this DVD is complied. For example, the disk information is in the form of 4 bit data. 0000b indicates a read-only disk standard. 0001b indicates a rewritable disk standard. 0010b indicates a recordable disk standard. Since the types of DVD are different from each other depending on such disk standards, the type of DVD can be determined on the basis of the disk standards.

The reproducing apparatus of the third embodiment of the present invention determines on the basis of the disk information whether the DVD to be reproduced is a recordable DVD or a read-only DVD. More specifically, as shown in FIG. 17, when starting reproduction of the DVD 1, the reproducing device 51 reads out the dick information 123 recorded in the physical format information 121 of the control data block 120 within the lead-in area 92, and outputs the read disk information to the controller 56 as the disk discrimination information DSI. On the basis of this, the controller 56 determines at the disk discrimination portion 56A' whether or not the DVD is a recordable DVD or a read-only DVD.

Thus, according to the third embodiment of the present invention, the disk discrimination can be easily carried out on the basis of the disk information 123A recorded on the DVD.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-204329 filed on Jul. 3, 1998 including the specification, claims, drawings and summary is incorporated herein by reference in its entirety.

What is claimed is:

1. An apparatus for reading record information from a recording disk and outputting the read record information in order to reproduce the record information recorded on the recording disk, the record information including: image information which represents an image or a picture; identification information which represents any one of at least never copy and copy free, the never copy indicating that copying of the record information is prohibited, the copy free indicating that the copying of the record information is permitted, the apparatus comprising:
a read device for reading the record information from the recording disk;
a first determination device for determining whether the identification information included in the read record information indicates the never copy or the copy free;
a second determination device for determining whether the recording disk is a recording disk of a recordable type or a recording disk of a read-only type;
an output control device for determining on the basis of determinations of the first determination device and the second determination device whether outputting the read record information is permitted or prohibited; and
an output device for outputting the read record information in accordance with a determination of the output control device, wherein
the second determination device comprises:
a detection device for detecting a form of a track formed on a surface of the recording disk; and
a disk determination device for determining on the basis of a detection of the detection device whether the recording disk is the recording disk of the recordable type or the recording disk of the read-only type.

2. An apparatus for reading record information from a recording disk and outputting the read record information in order to reproduce the record information recorded on the recording disk, the record information including: image information which represents an image or a picture; identification information which represents any one of at least never copy and copy free, the never copy indicating that copying of the record information is prohibited, the copy free indicating that the copying of the record information is permitted, the apparatus comprising:
a read device for reading the record information from the recording disk;
a first determination device for determining whether the identification information included in the read record information indicates the never copy or the copy free;
a second determination device for determining whether the recording disk is a recording disk of a recordable type or a recording disk of a read-only type;
an output control device for determining on the basis of determinations of the first determination device and the second determination device whether outputting the read record information is permitted or prohibited; and
an output device for outputting the read record information in accordance with a determination of the output control device, wherein the second determination device comprises:
a detection device for detecting a wobble of a track formed on a surface of the recording disk; and
a disk determination device for determining on the basis of a detection of the detecting device whether the recording disk is the recording disk of the recordable type or the recording disk of the read-only type.

3. An apparatus for reading record information from a recording disk and outputting the read record information in order to reproduce the record information recorded on the recording disk, the record information including: image information which represents an image or a picture; identification information which represents any one of at least never copy and copy free, the never copy indicating that copying of the record information is prohibited, the copy free indicating that the copying of the record information is permitted, the apparatus comprising:
a read device for reading the record information from the recording disk;
a first determination device for determining whether the identification information included in the read record information indicates the never copy or the copy free;
a second determination device for determining whether the recording disk is a recording disk of a recordable type or a recording disk of a read-only type;
an output control device for determining on the basis of determinations of the first determination device and the second determination device whether outputting the read record information is permitted or prohibited; and
an output device for outputting the read record information in accordance with a determination of the output control device, wherein:
each of the recording disk of the recordable type and the recording disk of the real-only type has a spiral track, the spiral track is formed on a surface of the recording disk, the record information is recorded on the spiral track,
the recording disk of the recordable type further has a loop track, the loop track is formed on the surface of the recording disk together with the spiral track, the loop track is different from the spiral track in form, and
the second determination device comprises:
a detection device for detecting the loop track formed on the surface of the recording disk; and
a disk determination device for determining on the basis of a detection of the detecting device whether the recording disk is the disk of the recordable type or the disk of the read-only type.

4. The apparatus according to claim 1, wherein the identification information is a watermark to be embedded in the image or the picture.

5. The apparatus according to claim 1, wherein the identification information is CGMS (Copy Generation Management System) information.

6. The apparatus according to claim 2, wherein the identification information is a watermark to be embedded in the image or the picture.

7. The apparatus according to claim 2, wherein the identification information is CGMS (Copy Generation Management System) information.

8. The apparatus according to claim 3, wherein the identification information is a watermark to be embedded in the image or the picture.

9. The apparatus according to claim 3, wherein the identification information is CGMS (Copy Generation Management System) information.

* * * * *